(12) United States Patent
Chung et al.

(10) Patent No.: US 8,964,673 B2
(45) Date of Patent: Feb. 24, 2015

(54) METHOD AND APPARATUS FOR PERFORMING A HYBRID AUTOMATIC REPEAT REQUEST PROCESS FOR AN UPLINK MULTI-CODEWORD TRANSMISSION IN A WIRELESS COMMUNICATION SYSTEM WHICH SUPPORTS A MULTI-ANTENNA TRANSMISSION

(75) Inventors: Jae Hoon Chung, Anyang-si (KR); Hyun Soo Ko, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 13/578,191

(22) PCT Filed: Feb. 22, 2011

(86) PCT No.: PCT/KR2011/001155
§ 371 (c)(1),
(2), (4) Date: Aug. 9, 2012

(87) PCT Pub. No.: WO2011/102697
PCT Pub. Date: Aug. 25, 2011

(65) Prior Publication Data
US 2012/0307775 A1 Dec. 6, 2012

Related U.S. Application Data

(60) Provisional application No. 61/306,923, filed on Feb. 22, 2010, provisional application No. 61/322,891, filed on Apr. 11, 2010, provisional application No. 61/323,052, filed on Apr. 12, 2010.

(51) Int. Cl.
*H04W 4/00* (2009.01)
*H04L 1/16* (2006.01)
*H04L 1/18* (2006.01)

(52) U.S. Cl.
CPC .............. *H04L 1/1671* (2013.01); *H04L 1/1822* (2013.01); *H04L 1/1896* (2013.01)
USPC ........................... 370/329; 714/748; 714/749

(58) Field of Classification Search
USPC ................. 370/252, 210, 280, 312, 315, 311, 370/328–342; 714/748, 749, 751, 750, 752; 455/95, 450; 375/260–267
See application file for complete search history.

(56) References Cited

U.S. PATENT DOCUMENTS

2008/0192718 A1    8/2008   Jongren et al.
(Continued)

FOREIGN PATENT DOCUMENTS

| KR | 10-2008-0003682 A | 1/2008 | |
|----|----|----|----|
| WO | WO 2009022872 A2 * | 2/2009 | ............ H04B 7/04 |

OTHER PUBLICATIONS

Rohde et al., "UMTS Long Term Evolution (LTE) Technology Introduction," Application Note 1MA111, Sep. 2008, pp. 1-55, (pp. 11, 12, 20 and Table 5).

*Primary Examiner* — Bob Phunkulh
*Assistant Examiner* — Wali Butt
(74) *Attorney, Agent, or Firm* — Birch, Stewart, Kolasch & Birch, LLP

(57) ABSTRACT

The present invention relates to a wireless communication system, and more particularly, to a method and apparatus for performing a hybrid automatic repeat request process for an uplink multi-codeword transmission in a wireless communication system which supports a multi-antenna transmission. The uplink multi-codeword transmission method according to one embodiment comprises the following steps: transmitting first and second codewords, transmitting information on the status of transmission buffer for the first and second codewords, receiving downlink control information (DCI) containing acknowledgement (ACK)/negative acknowledgement (NACK) information on each of the first and second codewords, and re-transmitting the codeword for NACK information, wherein the codeword for NACK information, wherein the codeword for ACK information is not transmitted to a base station in cases where the transmission buffer is empty.

14 Claims, 20 Drawing Sheets

(56) References Cited

U.S. PATENT DOCUMENTS

2010/0027460 A1* 2/2010 Kim et al. .................... 370/315
2011/0026622 A1* 2/2011 Luo et al. ..................... 375/260
2011/0103335 A1* 5/2011 Golitschek Edler von Elbwart et al. ............................ 370/329

* cited by examiner

US 8,964,673 B2

METHOD AND APPARATUS FOR PERFORMING A HYBRID AUTOMATIC REPEAT REQUEST PROCESS FOR AN UPLINK MULTI-CODEWORD TRANSMISSION IN A WIRELESS COMMUNICATION SYSTEM WHICH SUPPORTS A MULTI-ANTENNA TRANSMISSION

This application is the National Phase of PCT/KR2011/001155 filed on Feb. 22, 2011, which claims priority under 35 U.S.C. 119(e) to U.S. Provisional Application No. 61/306,923 filed on Feb. 22, 2010, U.S. Provisional Application No. 61/322,891 filed on Apr. 11, 2010 and U.S. Provisional Application No. 61/323,052 filed on Apr. 12, 2010, all of which are hereby expressly incorporated by reference into the present application.

TECHNICAL FIELD

The present invention relates to a wireless communication system, and more particularly, to a method and apparatus for performing a hybrid automatic repeat request (HARQ) process for uplink multiple-codeword transmission in a wireless communication system supporting multiple input and multiple output (MIMO) transmission.

BACKGROUND ART

In the $3^{rd}$ Generation Partnership Project Long Term Evolution (3GPP LTE) (or Rel-8 or Rel-9) standard, single carrier-frequency division multiple access (SC-FDMA) is used as an uplink multiple access scheme. In the 3GPP LTE-A (for example, 3GPP LTE release-10) standard which is evolved from the 3GPP LTE standard, introduction of a clustered Discrete Fourier Transform-Spread-Orthogonal Frequency Division Multiplexing (DFT-s-OFDMA) is being discussed as an uplink multiple access scheme. In the 3GPP LTE standard, uplink transmission via one transmit antenna of a user equipment (UE) is supported. In the 3GPP LTE-A standard, in order to increase uplink transmission throughput, a UE performs uplink transmission (uplink MIMO transmission) via a plurality of transmit antennas.

As technology applicable to uplink MIMO transmission, there is a multi-stream or multi-layer transmission scheme of one UE for the purpose of spatial multiplexing, which may be referred to as a single user-MIMO (SU-MIMO) scheme. When such uplink SU-MIMO is applied, link adaptation for matching a modulation scheme, a coding scheme, etc. per an individual transmission stream or an arbitrary transmission stream group according to radio link condition may be applied. To this end, in order to apply different modulation and coding schemes (MCSs) to individual transmission streams (or transmission stream groups), multiple-codeword based transmission may be performed.

At this time, a receiver may determine whether errors occur in an individual codeword with cyclic redundancy check (CRC) and generate acknowledgement/negative acknowledgement information. If errors do not occur, a reception state is expressed by ACK and, if errors occur, a reception state is expressed by NACK. The receiver may transmit the generated acknowledgement/negative acknowledgement information to a transmitter so as to perform hybrid automatic repeat request (HARQ) transmission. HARQ transmission refers to a method of retransmitting previously transmitted data at a transmitter when receiving a NACK signal from a receiver and combining the previously received data and the retransmitted data at the receiver so as to improve retransmission performance.

DISCLOSURE

Technical Problem

In the conventional 3GPP LTE system, since only a HARQ operation for uplink single-codeword based transmission is defined, it is difficult to apply the HARQ operation for uplink single-codeword based transmission to multiple-codeword based transmission without change.

An object of the present invention is to provide a method of transmitting a plurality of pieces of acknowledgement (ACK)/negative acknowledgement (NACK) information generated by a receiver to a user equipment (UE) in an uplink multiple-codeword SU-MIMO transmission scheme. In addition, another object of the present invention is to provide a method and apparatus for enabling a transmitter to accurately perform a HARQ operation in an uplink multiple-codeword SU-MIMO transmission scheme and reducing unnecessary signaling so as to increase efficiency.

The technical problems solved by the present invention are not limited to the above technical problems and other technical problems which are not described herein will become apparent to those skilled in the art from the following description.

Technical Solution

The object of the present invention can be achieved by providing a method of performing uplink multiple-codeword hybrid automatic repeat request (HARQ) transmission, the method including, at a user equipment, transmitting first and second codewords to a base station, transmitting information about transmission buffer states of the first and second codewords to the base station, receiving downlink control information (DCI) including acknowledgement (ACK)/negative acknowledgement (NACK) information for each of the first and second codewords from the base station, and retransmitting a codeword corresponding to NACK, wherein a codeword corresponding to ACK is not transmitted to the base station when the transmission buffer is empty.

In another aspect of the present invention, there is provided a method of receiving uplink multiple-codeword hybrid automatic repeat request (HARQ) transmission, the method including, at a base station, receiving first and second codewords from a user equipment, receiving information about transmission buffer states of the first and second codewords from the user equipment, transmitting downlink control information (DCI) including acknowledgement (ACK)/negative acknowledgement (NACK) information for each of the first and second codewords to the user equipment, and receiving a retransmitted codeword corresponding to NACK, wherein a codeword corresponding to ACK is not transmitted from the user equipment when the transmission buffer is empty.

In another aspect of the present invention, there is provided a user equipment for performing uplink multiple-codeword hybrid automatic repeat request (HARQ) transmission, the user equipment including transmission module configured to transmit an uplink signal to a base station, a reception module configured to receive a downlink signal from the base station, and a processor configured to control the user equipment including the reception module and the transmission module, wherein the processor transmits, to the base station, first and second codewords and information about transmission buffer states of the first and second codewords through the transmission module, receives downlink control information (DCI) including acknowledgement (ACK)/negative acknowledgement (NACK) information for each of the first and second codewords through the reception module, and retransmits a codeword corresponding to NACK through the transmission module, and wherein a codeword corresponding to ACK is not transmitted to the base station when the transmission buffer is empty.

In another aspect of the present invention, there is provided a base station for receiving uplink multiple-codeword hybrid automatic repeat request (HARQ) transmission, the base station including a transmission module configured to transmit a downlink signal to a user equipment; a reception module configured to receive an uplink signal from the user equipment, and a processor configured to control the base station including the reception module and the transmission module, wherein the processor receives, through the reception module, first and second codewords and information about transmission buffer states of the first and second codewords, transmits downlink control information (DCI) including acknowledgement (ACK)/negative acknowledgement (NACK) information for each of the first and second codewords through the transmission module, and receives retransmission of a codeword corresponding to NACK through the reception module, wherein a codeword corresponding to ACK is not transmitted from the user equipment when the transmission buffer is empty.

The following features may be applied to the above-described embodiments of the present invention.

If the information about the transmission buffer state indicates that the transmission buffer is empty, the DCI may further include an indicator indicating that the base station confirms the empty state of the transmission buffer, and, if the UE receives the indicator, the codeword corresponding to ACK may not be transmitted to the base station. The information about the transmission buffer state may be multiplexed with uplink data and may be transmitted.

The DCI may be control information scheduling uplink transmission. The ACK/NACK information may be indicated through a predetermined field of the DCI. The predetermined field may be a new data indicator (NDI) field.

The UE may receive a physical HARQ indicator channel (PHICH) of the first and second codewords from the base station, and the DCI may be transmitted from the base station after P ($0 \leq P \leq \alpha$, $\alpha$ being a predetermined natural number) subframes from a subframe in which the PHICH is transmitted.

The above general description and the following detailed description of the present invention are exemplary and are intended to additionally describe the claims.

Advantageous Effects

According to the present invention, it is possible to provide a method for providing ACK/NACK information of multiple-codeword transmission from a receiver to a transmitter, for an accurate and efficient HARQ operation in uplink multiple-codeword based transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Figure 1:
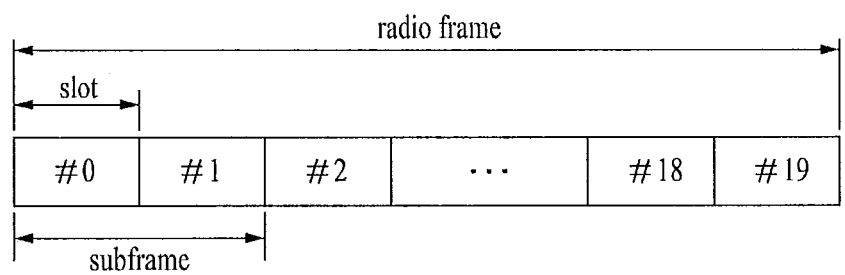
FIG. 1 is a diagram showing the structure of a radio frame used in a $3^{rd}$ Generation Partnership Project Long Term Evolution (3GPP LTE) system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms relay node (RN) or relay station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and LTE-A. However, the technical spirit of the present invention is not limited thereto.

FIG. 1 is a diagram showing the structure of a radio frame used in a $3^{rd}$ Generation Partnership Project Long Term Evolution (3GPP LTE) system. One downlink frame includes 10 subframes, and one subframe includes two slots in a time domain. A time required for transmitting one subframe is referred to as a Transmission Time Interval (TTI). For example, one subframe may have a length of 1 ms and one slot may have a length of 0.5 ms. One slot may include a plurality of OFDM symbols in a time domain. In the 3GPP LTE system, since an OFDMA scheme is used in downlink, the OFDM symbol indicates one symbol period. One symbol may be called an SC-FDMA symbol or symbol period in uplink. A resource block (RB) is a resource allocation unit and includes a plurality of contiguous subcarriers in one slot. The structure of the radio frame is only exemplary. Accordingly, the number of subframes included in the radio frame, the number of slots included in the subframe or the number of OFDM symbols included in the slot may be changed in various manners.

Figure 2:
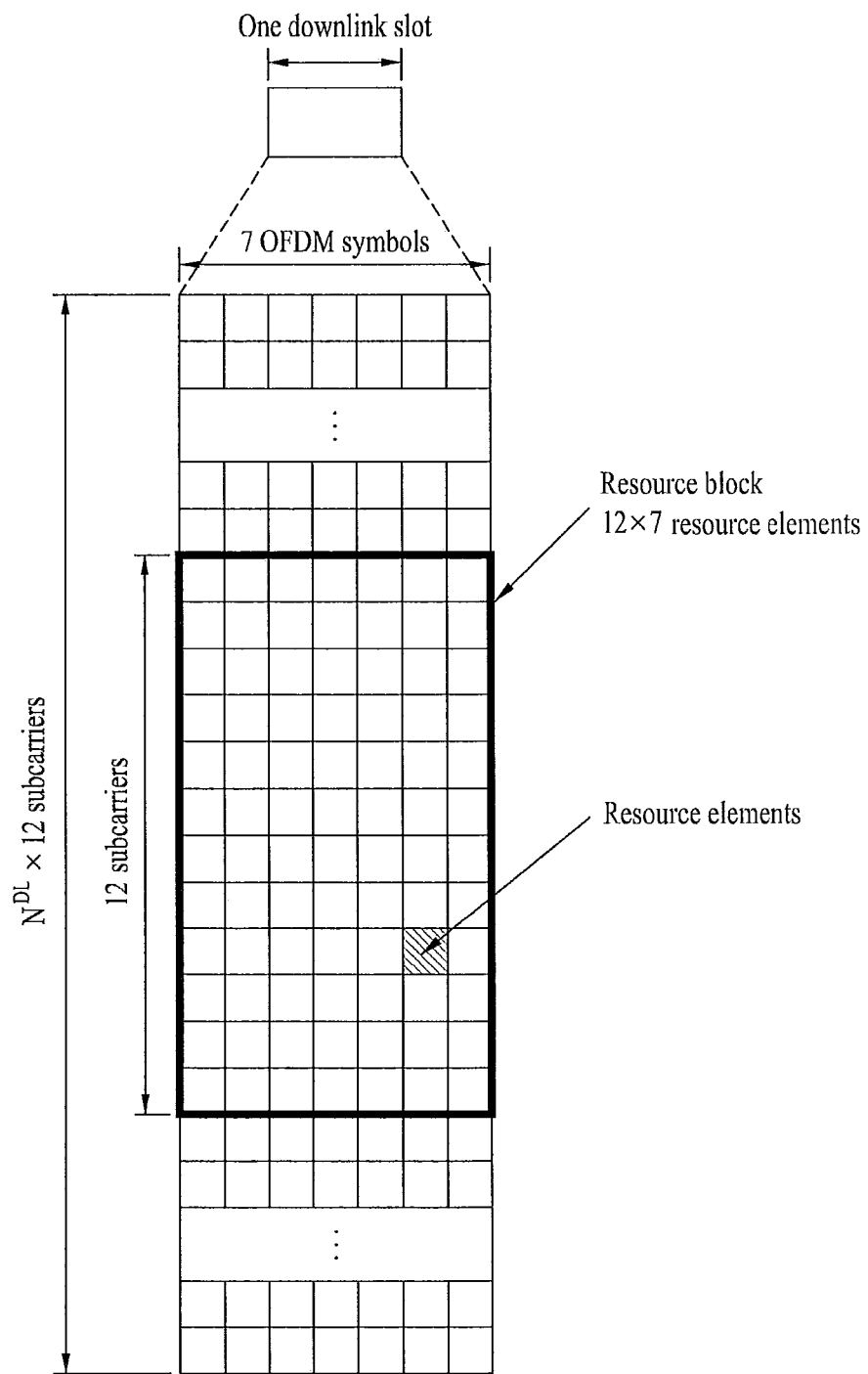
FIG. 2 is a diagram showing a resource grid of a downlink slot.

FIG. 2 is a diagram showing a resource grid of a downlink slot. One downlink slot includes seven OFDM symbols in a time domain and one RB includes 12 subcarriers in a frequency domain, to which the present invention is not limited. For example, one slot includes seven OFDM symbols in a normal cyclic prefix (CP) and one slot includes six OFDM symbols in an extended CP. Each element of the resource grid is referred to as a Resource Element (RE). One RB includes 12×7 REs. The number $N^{DL}$ of RBs included in the downlink slot is determined based on downlink transmission bandwidth. The structure of an uplink slot may be equal to that of the downlink slot.

Figure 3:
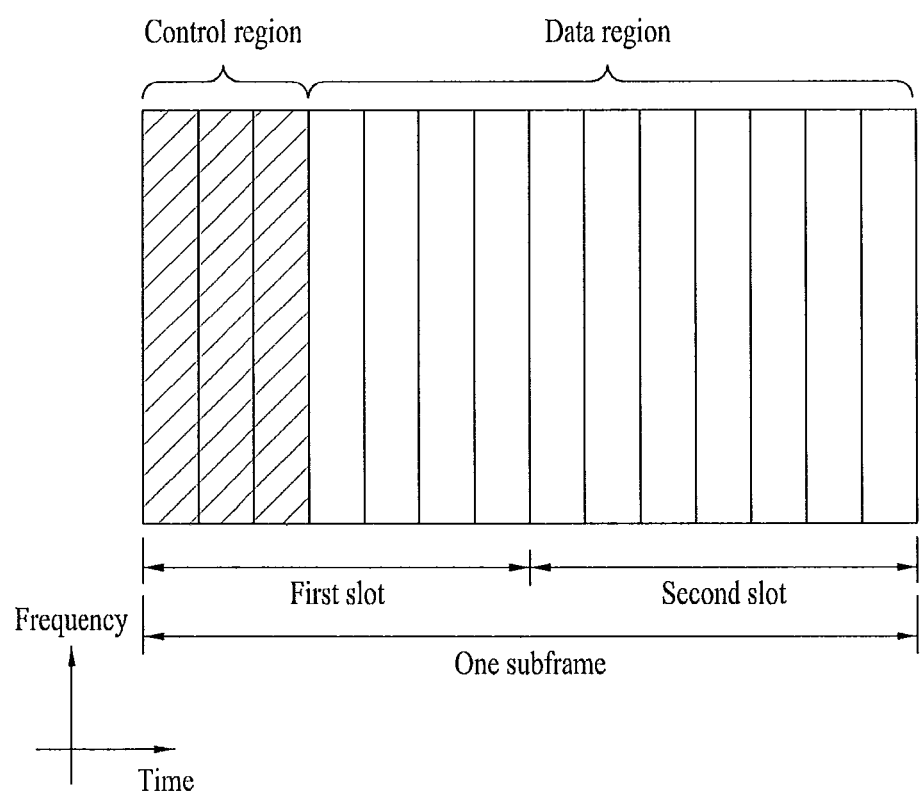
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which control channels are allocated. The remaining OFDM symbols correspond to a data region to which Physical Downlink Shared Channels (PDSCHs) are allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for an arbitrary UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, set of transmit power control commands for an individual UEs in a certain UE group, transmit power control information, activation of Voice over IP (VoIP), etc. A plurality of PDCCHs may be transmitted within the control region. A UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the terminal, and attaches a Cyclic Redundancy Check (CRC) to control information. The CRC is masked with a Radio Network Temporary Identifier (RNTI) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the terminal, a random access-RNTI (RA-RNTI) may be masked to the CRC.

Figure 4:
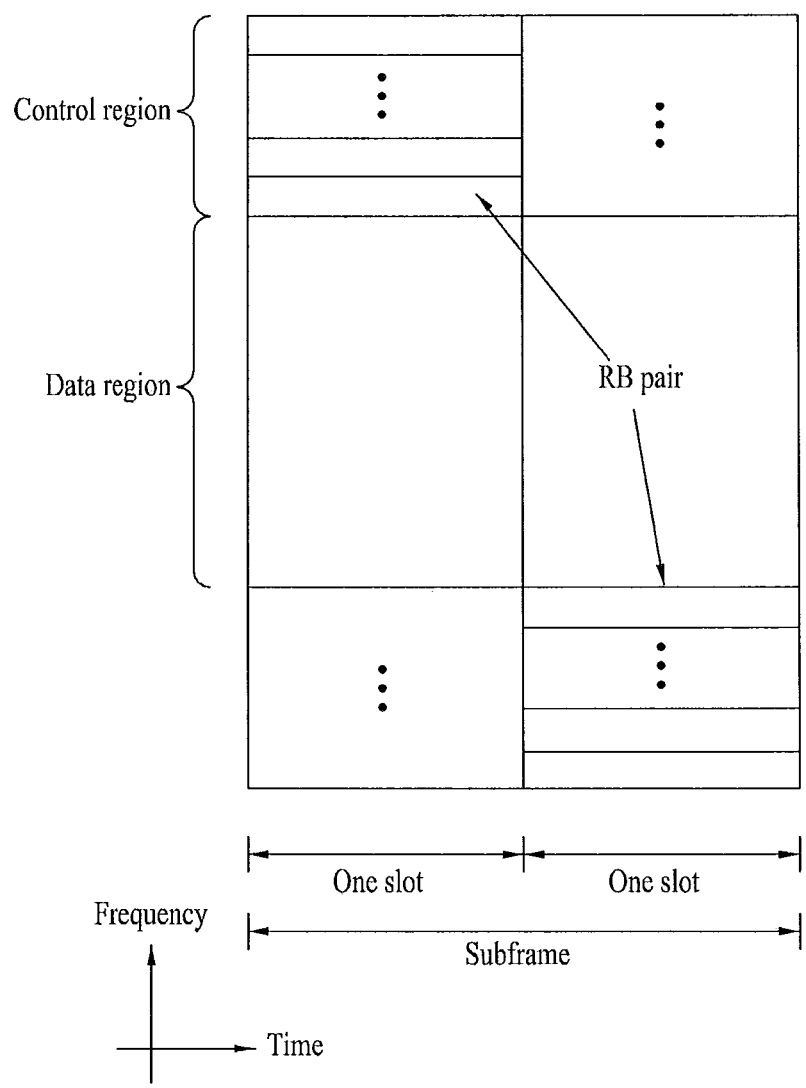
FIG. 4 is a diagram showing the structure of an uplink subframe.

FIG. 4 is a diagram showing the structure of an uplink subframe. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Uplink Multiple Access Scheme

Hereinafter, uplink multiple access schemes will be described.

First, an SC-FDMA transmission scheme will be described. SC-FDMA may be referred to as DFT-s-OFDMA and is differentiated from the below-described clustered DFT-s-OFDMA.

SC-FDMA refers to a scheme for maintaining a low peak-to-average power ratio (PAPR) or cubic metric (CM) value and efficiently performing transmission while avoiding a non-linear distortion part of a power amplifier. The PAPR is a parameter representing waveform properties and is obtained by dividing a peak value of a waveform amplitude by a root mean square (RMS) value. The CM is another measurement value representing the PAPR value. The PAPR is associated with a dynamic range which should be supported by a power amplifier at a transmitter. That is, in order to support a transmission scheme with a high PAPR value, the dynamic range (or a linear part) of the power amplifier needs to be increased. As the dynamic range of the power amplifier is increased, the cost of the power amplifier is increased. Thus, a transmission scheme with a low PAPR value is advantageous in uplink transmission. Accordingly, SC-FDMA capable of maintaining a low PAPR value has been used as an uplink transmission scheme of a current 3GPP LTE system.

Figure 5:
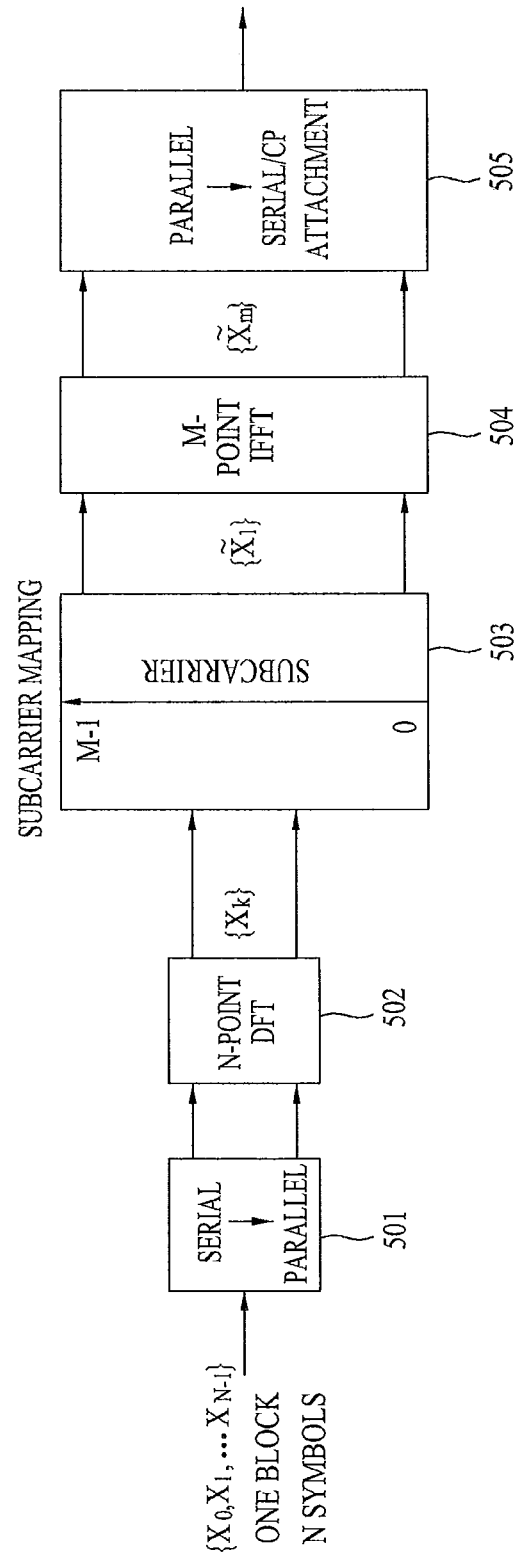
FIG. 5 is a diagram showing the structure of a transmitter according to an SC-FDMA scheme.

FIG. 5 is a diagram showing the structure of a transmitter according to an SC-FDMA scheme.

One block composed of N symbols input to the transmitter is converted into a parallel signal via a serial-to-parallel converter 501. The parallel signal is spread via an N-point DFT module 502 and the spread signal is mapped to a frequency domain by a subcarrier mapping module 503. A signal on each subcarrier is a linear combination of N symbols. The signal mapped to the frequency domain is converted into a time domain signal via an M-point IFFT module 504. The time domain signal is converted into a serial signal via a parallel-to-serial converter 505 and is subjected to CP attachment. Influence of the IFFT process of the M-point IFFT module 404 is partially offset by the DFT process of the N-point DFT module 502. The signal input to the DFT module 502 has a low PAPR, a signal subjected to the DFT process has a high PAPR, and a signal output after the IFFT process of the IFFT module 504 may have a low PAPR.

Figure 6A:
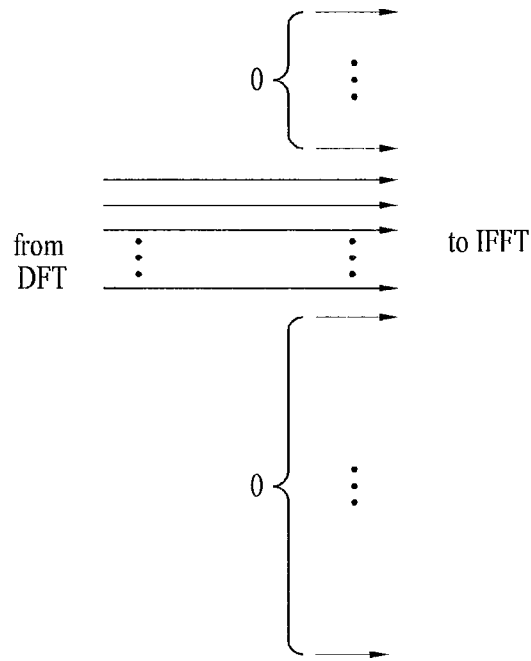
FIG. 6 is a diagram illustrating a method of mapping a signal output from a DFT module of FIG. 5 to a frequency domain.
Figure 6B:
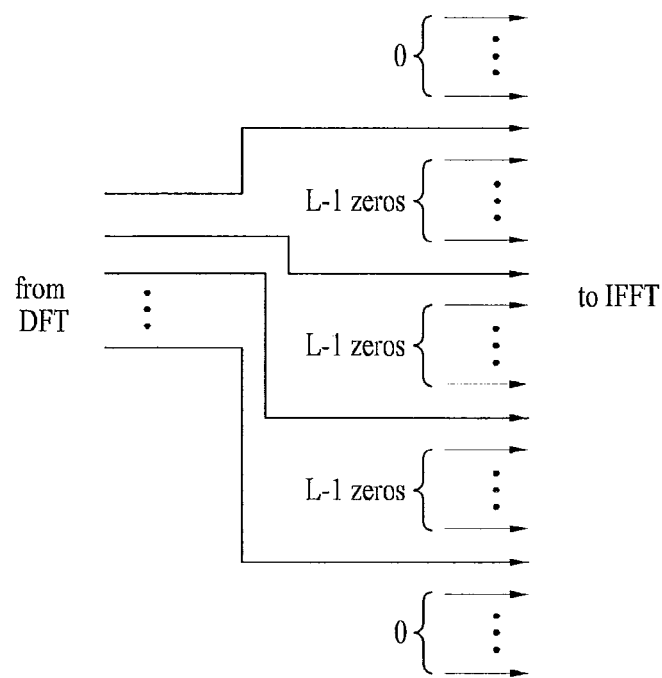

FIG. 6 is a diagram illustrating a method of mapping a signal output from the DFT module 502 to a frequency domain. By performing one of two methods shown in FIG. 6, a signal output from an SC-FDMA transmitter may satisfy a single carrier property. FIG. 6(a) shows a localized mapping scheme in which the signal output from the DFT module 502 is restrictively mapped to a specific part of a subcarrier region. FIG. 6(b) shows a distributed mapping scheme in which the signal output from the DFT module 502 is distributed and mapped to the entire subcarrier region. In the conventional 3GPP LTE standard (e.g., release 8), the localized mapping scheme is used.

Figure 7:
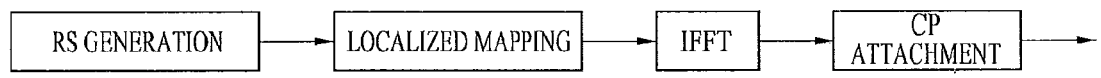
FIG. 7 is a block diagram illustrating transmission of a demodulation reference signal (DM-RS) in Single Carrier Frequency Division Multiple Access (SC-FDMA) transmission.

FIG. 7 is a block diagram illustrating a process of transmitting a reference signal (RS) for demodulating a transmitted signal according to an SC-FDMA scheme. In the conventional 3GPP LTE standard (e.g., release 8), in a data part, a signal generated in a time domain is converted into a frequency domain signal through a DFT process, is subjected to subcarrier mapping, is subjected to an IFFT process, and then is transmitted (see FIG. 5). However, an RS is immediately generated in a frequency domain without performing a DFT process (S701), is mapped to a subcarrier (S702), is subjected to an IFFT process (S703), is subjected to CP attachment (S704), and is transmitted.

Figure 8A:
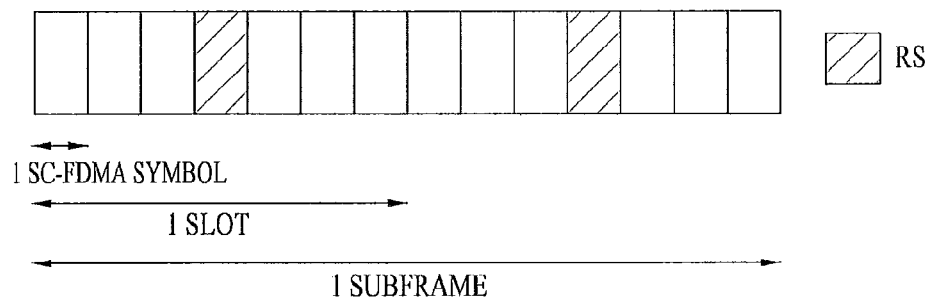
FIG. 8 is a diagram showing a symbol position, to which a reference signal (RS) is mapped, in a subframe structure according to an SC-FDMA scheme.
Figure 8B:
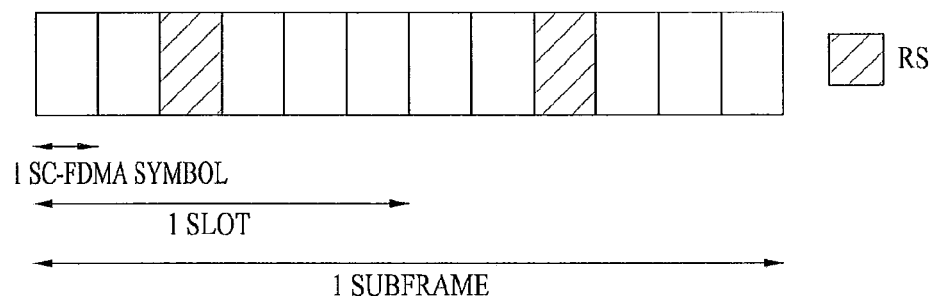

FIG. 8 is a diagram showing a position of a symbol, to which an RS is mapped, in a subframe structure according to an SC-FDMA scheme. FIG. 8(a) shows an RS which is positioned at a fourth SC-FDMA symbol of each of two slots in one subframe in the case of a normal CP. FIG. 8(b) shows an RS which is positioned at a third SC-FDMA symbol of each of two slots in one subframe in the case of an extended CP.

A clustered DFT-s-OFDMA scheme will be described with reference to FIGS. 9 to 12. The clustered DFT-s-OFDMA is modified from the above-described SC-FDMA and segments the DFT-processed signal into a plurality of sub-blocks and maps the sub-blocks at separate positions in the frequency domain.

Figure 9:
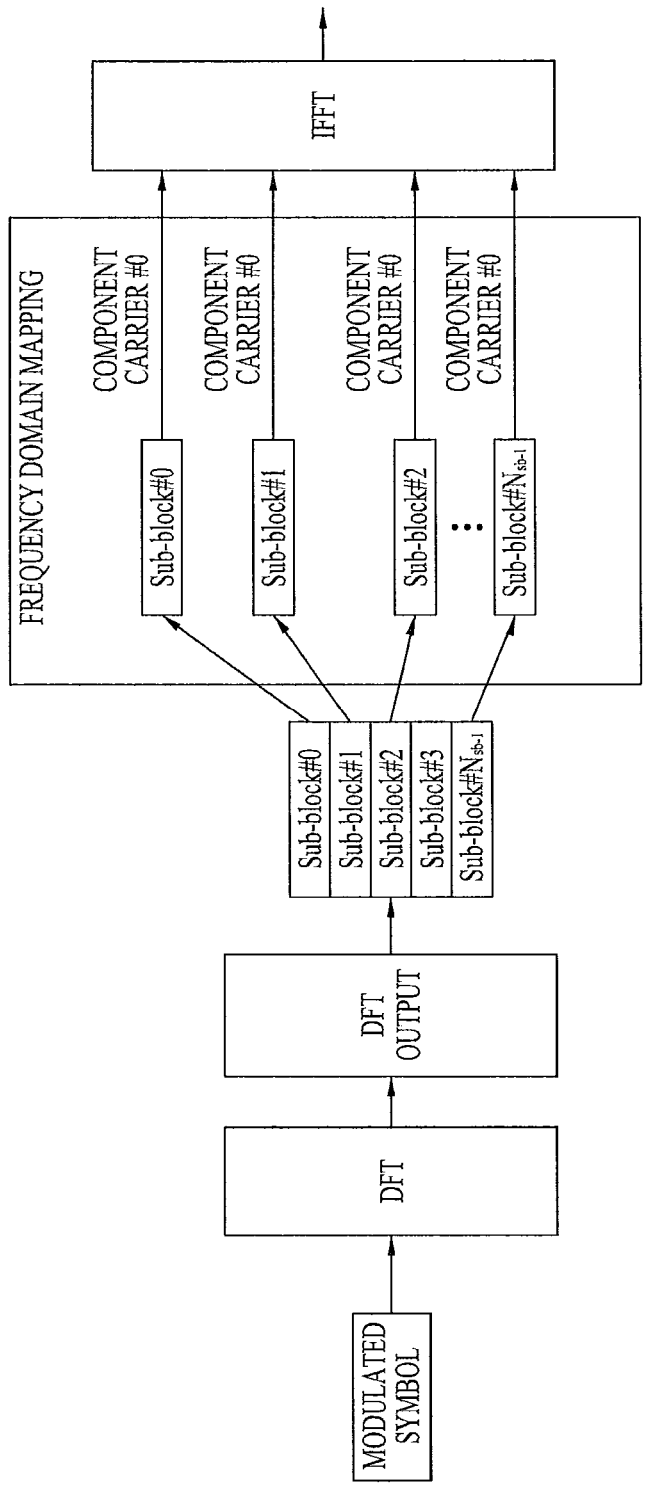
FIG. 9 is a diagram illustrating a clustered DFT-s-OFDMA scheme in a single carrier system.

FIG. 9 is a diagram illustrating a clustered DFT-s-OFDMA scheme in a single carrier system. For example, a DFT output may be divided into Nsb sub-block (sub-blocks #0 to #Nsb-1). In mapping of the sub-blocks to the frequency domain, the sub-blocks #0 to #Nsb-1 may be mapped to one carrier (e.g., a carrier having a bandwidth of 20 MHz) and the sub-blocks may be mapped to positions separated from each other in the frequency domain. The sub-blocks may be locally mapped to the frequency domain.

Figure 10:
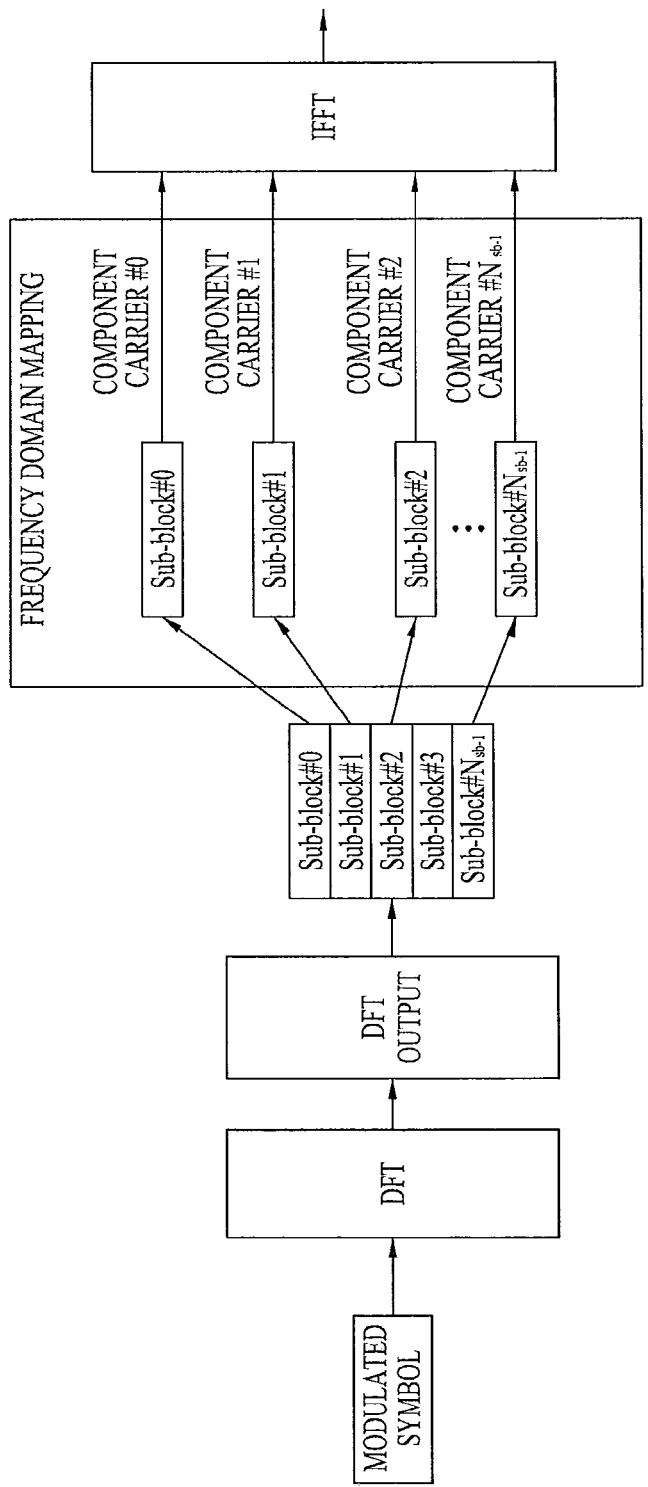
FIGS. 10 to 12 are diagrams illustrating a clustered DFT-s-OFDMA scheme in multiple-carrier system.
Figure 11:
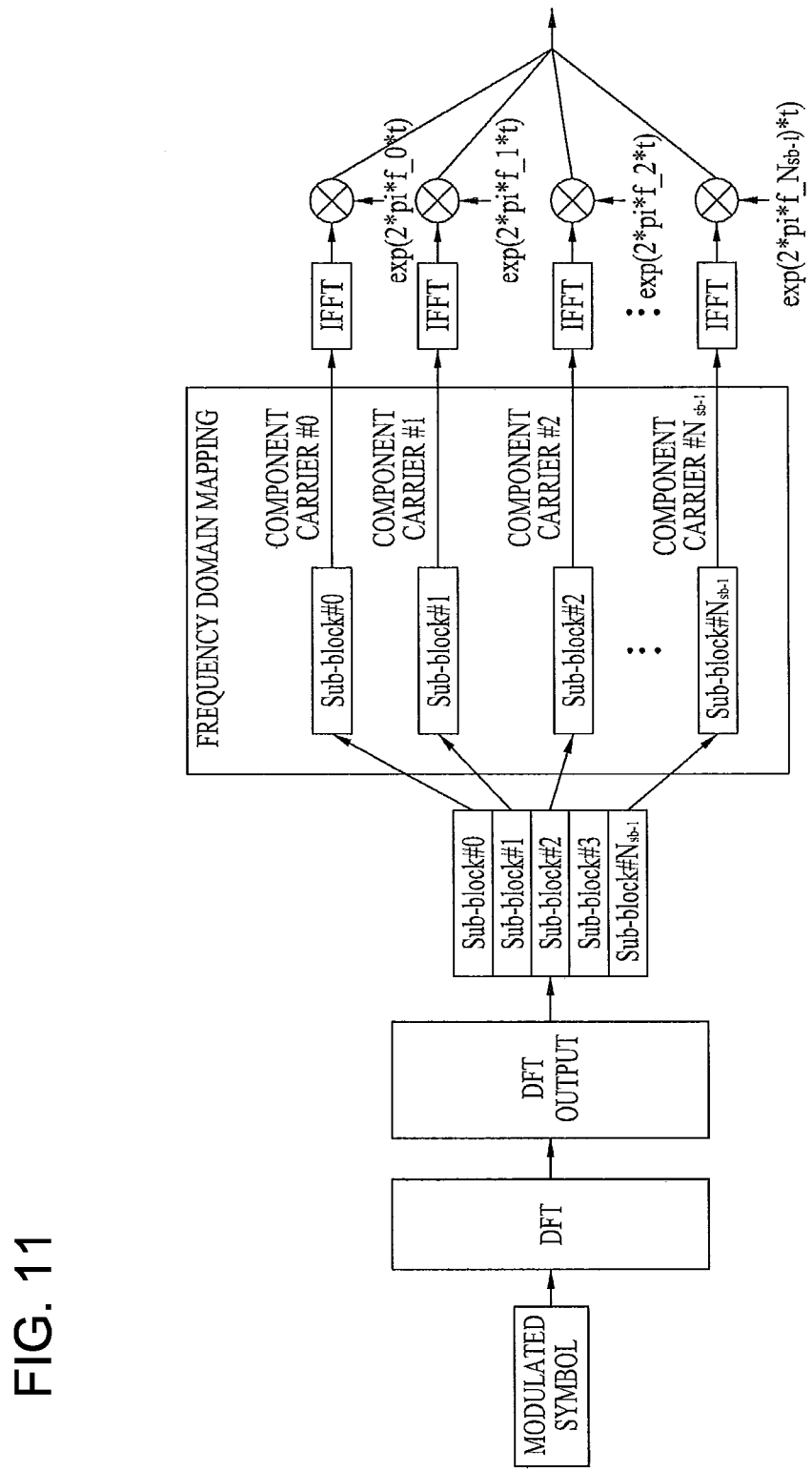

FIGS. 10 to 11 are diagrams illustrating a clustered DFT-s-OFDMA scheme in a multiple carrier system.

FIG. 10 is a diagram showing an example of generating a signal via one IFFT module in the case in which subcarrier spacing is aligned between adjacent carriers in a state in which multiple carriers are contiguously configured (that is, frequency bands of multiple carriers are contiguously allocated). For example, a DFT output may be divided into Nsb sub-block (sub-blocks #0 to #Nsb-1). In mapping of the sub-blocks to the frequency domain, the sub-blocks #0 to #Nsb-1 may be mapped to component carriers #0 to #Nsb-1 (e.g., each component carrier having a bandwidth of 20 MHz). The sub-blocks may be locally mapped to the frequency domain.

The sub-blocks mapped to the respective component carriers may be converted into time domain signals via one IFFT module.

FIG. 11 is a diagram showing an example of generating a signal via a plurality of IFFT modules in a state in which multiple carriers are non-contiguously configured (that is, frequency bands of multiple carriers are non-contiguously allocated). For example, a DFT output may be divided into Nsb sub-block (sub-blocks #0 to #Nsb-1). In mapping of the sub-blocks to the frequency domain, the sub-blocks #0 to #Nsb-1 may be mapped to component carriers #0 to #Nsb-1 (e.g., each component carrier having a bandwidth of 20 MHz). The sub-blocks may be locally mapped to the frequency domain. The sub-blocks mapped to the respective component carriers may be converted into time domain signals via the respective IFFT modules.

While the clustered DFT-s-OFDMA on the single carrier described with reference to FIG. 9 is intra-carrier DFT-s-OFDMA, the clustered DFT-s-OFDMA on the multiple carriers described with reference to FIGS. 10 and 11 is inter-carrier DFT-s-OFDMA. Intra-carrier DFT-s-OFDMA and inter-carrier DFT-s-OFDMA may be used interchangeably.

Figure 12:
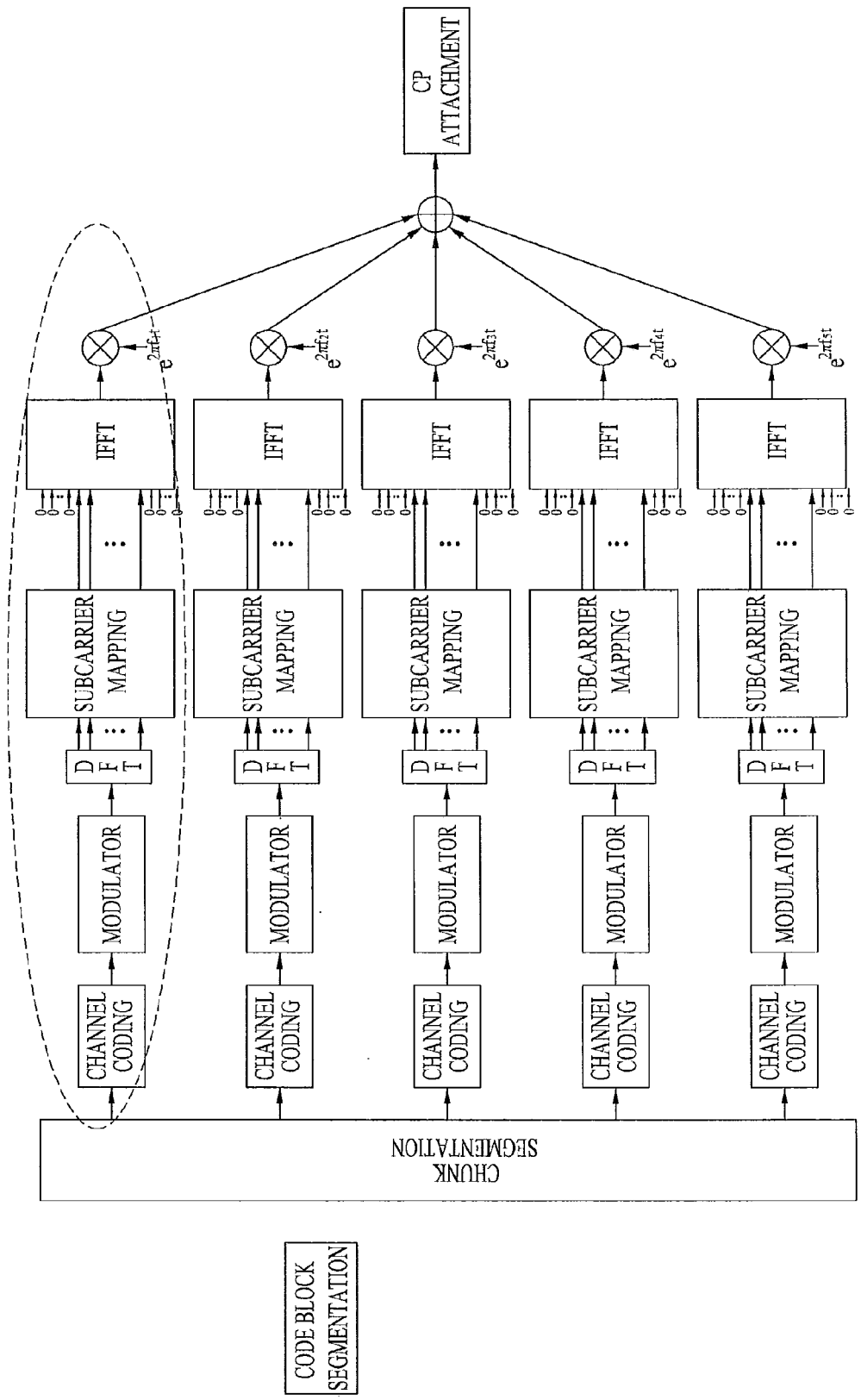

FIG. 12 is a diagram illustrating a chunk-specific DFT-s-OFDMA scheme for performing a DFT process, a frequency domain mapping process and an IFFT process in chunk units. Chunk-specific DFT-s-OFDMA may be referred to as Nx SC-FDMA. A code block segmented signal is segmented into chunks and channel coding and modulation are performed with respect to each chunk. The modulated signal is subjected to the DFT process, the frequency domain mapping process and the IFFT process using the method described with reference to FIG. 5 and the outputs of the IFFT modules are summed and are subjected to CP attachment. The Nx SC-FDMA scheme described with reference FIG. 12 is applicable to contiguous multiple carriers or non-contiguous multiple carriers.

MIMO System

In the MIMO technique, a single antenna path is not used for receiving one message. Instead, in the MIMO technique, data fragments received via several antennas are collected and combined so as to complete data. Since the MIMO technique improves a data transmission rate in a specific range or increases system coverage with respect to a specific data transmission rate, this technique is a next-generation mobile communication technique which may be used in mobile communication terminals and relay nodes. The MIMO technique is attracting attention as a next-generation technique for overcoming a limit in transmission amount due to increase in data traffic.

The MIMO technique may be classified into a space multiplexing scheme and a space diversity scheme, depending on whether or not the same data is transmitted. The space multiplexing method refers to a scheme for simultaneously transmitting different data via a plurality of transmit/receive antennas such that a transmitter transmits different data via transmit antennas and a receiver identifies the transmitted data through appropriate interference cancellation and signal processing, thereby improving a transmission rate by the number of transmit antennas. The space diversity scheme refers to a scheme for transmitting the same data via a plurality of transmit antennas so as to obtain transmit diversity, and includes a space time channel coding scheme. The space diversity scheme does not improve a transmission rate, but increases transmission reliability due diversity gain. Such schemes may be appropriately combined so as to obtain advantages. In addition, the MIMO system includes an open loop scheme (or a channel independent scheme) and a closed loop scheme (or a channel dependent scheme) depending on whether channel information is fed back.

FIG. 13 is a diagram showing the configuration of a general MIMO communication system. As shown in FIG. 10(a), if the number of transmit antennas is increased to $N_T$ and, at the same time, the number of receive antennas is increased to $N_R$, channel transmission capacity is theoretically increased as compared with the case where multiple antennas are used in only one of the transmitter or the receiver. Accordingly, a transmission rate can be improved and frequency efficiency can be remarkably improved. A transmission rate due to increase in channel transmission capacity can be theoretically increased by a value obtained by multiplying a maximum transmission rate $R_o$ when one antenna is used by an increase ratio $R_i$ shown in Equation 1.

$$R_i = \min(N_T, N_R) \quad \text{Equation 1}$$

For example, in a MIMO system using four transmit antennas and four receive antennas, it is possible to theoretically acquire a transmission rate which is four times that of a single antenna system.

Figure 13A:
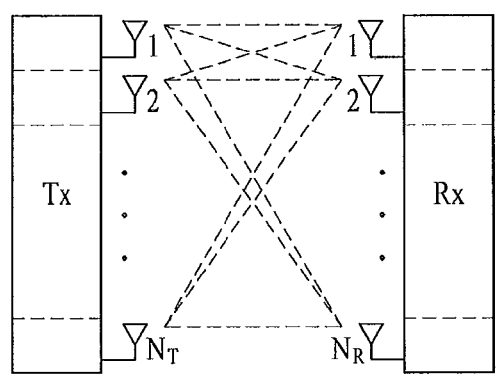
FIG. 13 is a diagram illustrating a MIMO transmission scheme.

The communication method of the MIMO system will be described in greater detail using mathematical modeling. As shown in FIG. 13(a), it is assumed that $N_T$ transmit antennas and $N_R$ receive antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \quad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{S}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel status, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

If the $N_R$ receive antennas are present, respective received signals $y_1, y_2, \ldots, y_{N_R}$ the antennas are expressed as shown in Equation 6

$$y = [y_1, y_2, \ldots, y_{N_R}]^T \quad \text{Equation 6}$$

If channels are modeled in the MIMO communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

Figure 13B:
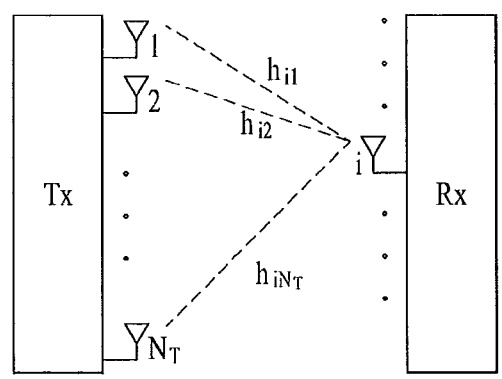

Several channels may be combined and expressed in the form of a vector and a matrix. The vector will now be described. FIG. 13(b) is a diagram showing channels from the $N_T$ transmit antennas to the receive antenna i.

As shown in FIG. 13(b), the channels from the $N_T$ transmit antennas to the receive antenna i may be expressed as follows.

$$h_i^T = [h_{i1}, h_{i2}, \ldots, h_{iN_T}] \quad \text{Equation 7}$$

Accordingly, through the matrix of Equation 7, all the channels from the $N_T$ transmit antennas to the $N_R$ receive antennas may be expressed as shown in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{Equation 8}$$

An Additive White Gaussian Noise (AWGN) is added to the actual channels after a channel matrix H. The AWGN $n_1$, $n_2, \ldots, n_{N_R}$ added to the $N_R$ receive antennas may be expressed as shown in Equation 9.

$$n = [n_1, n_2, \ldots, n_{N_R}]^T \quad \text{Equation 9}$$

Through the above-described mathematical modeling, the received signals may be expressed as shown in Equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{Equation 10}$$

$$= Hx + n$$

The number of rows and columns of the channel matrix H indicating the channel status is determined by the number of transmit and receive antennas. The number of rows of the channel matrix H is equal to the number $N_R$ of receive antennas and the number of columns thereof is equal to the number $N_T$ of transmit antennas. That is, the channel matrix H may be expressed by an $N_R \times N_T$ matrix. In general, the rank of the matrix is defined by the smaller of the number of rows or columns, which is independent from each other. Accordingly, the rank of the matrix is not greater than the number of rows or columns. The rank of the channel matrix H may be expressed by Equation 11.

$$\text{rank}(H) \leq \min(N_T, N_R) \quad \text{Equation 11}$$

The MIMO channel matrix according to the number of receive antennas and the number of transmit antennas may be decomposed into a plurality of independent channels and each independent channel is referred to as a layer or stream. The number of layers or streams or a space multiplexing rate is referred to as rank.

As described above, in the 3GPP LTE-A (LTE Release-10) system, an uplink MIMO transmission scheme is applicable in order to increase uplink transmission throughput. As technology applicable to uplink MIMO transmission, there is a multi-stream or multi-layer transmission scheme of one arbitrary UE for the purpose of spatial multiplexing, which may be referred to as a single user-MIMO (SU-MIMO) scheme. In such an uplink SU-MIMO scheme, link adaptation may be applied on a per individual transmission stream or arbitrary transmission stream group basis. In order to apply link adaptation, a modulation and coding scheme (MCS) is applicable. To this end, multiple-codeword (MCW) based transmission may be performed in uplink.

In a MIMO structure using MCW, for example, a maximum of two codewords may be simultaneously transmitted. For such MIMO transmission, modulation and coding scheme (MCS) information used by a transmitter, a new data indicator (NDI) indicating whether transmitted data is new data or retransmitted data, and redundancy version (RV) information indicating which subpacket is retransmitted in case of retransmission, etc. are necessary. The MCS, NDI and RV information may be defined per transport block (TB) and one or more of pieces of the MCS, NDI and RV information may be omitted in an arbitrary TB.

Figure 14:
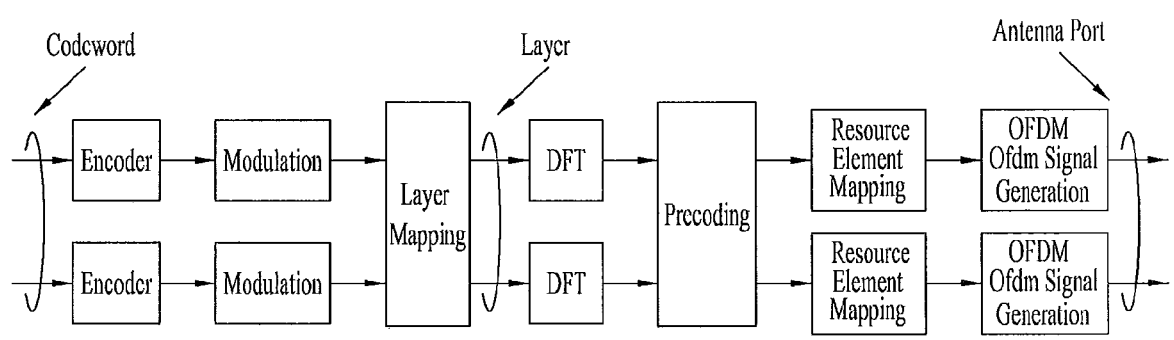
FIG. 14 is a block diagram showing a DFT-s-OFDMA uplink transmission configuration.

FIG. 14 is a block diagram showing uplink MCW based SU-MIMO transmission configuration.

One or more codewords encoded by an encoder may be scrambled using a UE-specific scrambling signal. The scrambled codewords are modulated to complex symbols using a BPSK, QPSK, 16 QAM or 640 QAM scheme according to the kind of the transmitted signal and/or channel status. Thereafter, the modulated complex symbols are mapped to one or more layers. If a signal is transmitted using a single antenna, one codeword is mapped to one layer and is transmitted. However, if a signal is transmitted using multiple antennas, a codeword-to-layer mapping relationship is defined as shown in Tables 1 and 2 according to a transmission scheme.

TABLE 1

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |

TABLE 2

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |

TABLE 2-continued

| Number of layers | Number of code words | Codeword-to-layer mapping $i = 0, 1, \ldots, M_{symb}^{layer} - 1$ | |
|---|---|---|---|
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} = \begin{cases} M_{symb}^{(0)}/4 & \text{if } M_{symb}^{(0)} \bmod 4 = 0 \\ (M_{symb}^{(0)}+2)/4 & \text{if } M_{symb}^{(0)} \bmod 4 \neq 0 \end{cases}$<br>If $M_{symb}^{(0)} \bmod 4 \neq 0$ two null symbols shall be appended to $d^{(0)}(M_{symb}^{(0)} - 1)$ |

Table 1 shows the case of transmitting a signal using a spatial multiplexing scheme and Table 2 shows the case of transmitting a signal using a transmit diversity scheme. In Tables 1 and 2, $x^{(a)}$(i) indicates an i-th symbol of a layer having an index a and $d^{(a)}$(i) indicates an i-th symbol of a codeword having an index a. A mapping relationship between the number of codewords and the number of layers used for transmission may be confirmed through the item "number of layers" and the item "number of codewords" of Tables 1 and 2, and the item "codeword-to-layer mapping" indicates how symbols of codewords are respectively mapped to layers.

As can be seen from Tables 1 and 2, although one codeword may be mapped to one layer and transmitted in symbol units, one codeword may be distributed and mapped to a maximum of four layers as in the second case of Table 2. If one codeword is distributed and mapped to a plurality of layers, symbols configuring each codeword are sequentially mapped to the layers and are transmitted. In a single-codeword transmission configuration, only one encoder and one modulation block are used.

Discrete Fourier Transform (DFT) is applicable to layer-mapped signals. The layer-mapped signals are multiplied by a predetermined precoding matrix selected according to channel status and are allocated to transmit antennas. In a DFT-s-OFDMA configuration, in order to prevent a transmission PAPR (or CM) of a UE from being increased while applying predetermined precoding, precoding may be performed in a frequency domain after applying DFT.

The per-antenna transmitted signals may be mapped to time-frequency resource elements to be used for transmission and may be transmitted via OFDM signal generators and antennas.

Figure 15A:
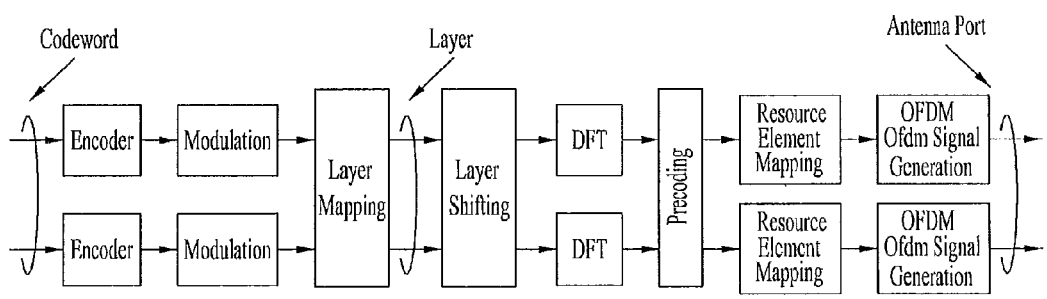
FIGS. 15(a) and 15(b) are block diagrams showing an example in which layer shifting is applied to DFT-s-OFDMA uplink transmission.
Figure 15B:
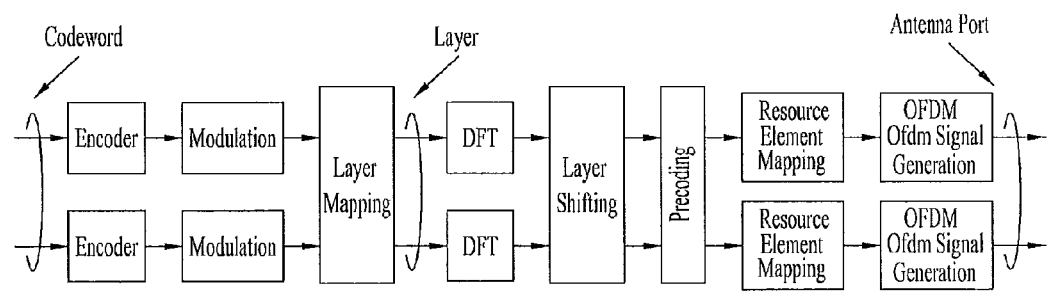

FIG. 15 is a block diagram showing a configuration in which layer shifting is applied to an uplink MCW based SU-MIMO transmission configuration.

Layer shifting (or layer permutation) means that a transmission stream or transmission layer mapping order is changed in time resource region units (e.g., OFDM symbol units or slot units). Layer shifting may be performed before a DFT process (FIG. 15(a)) or after a DFT process (FIG. 15(b)). Alternatively, layer shifting may be performed after OFDM signal generation. If layer shifting is applied, error probabilities of two codewords (or TBs) are the same and thus only ACK/NACK information of one of the two codewords may be transmitted. However, layer shifting is not always performed and may be excluded from an uplink transmission configuration.

HAQR Operation

Figure 16:
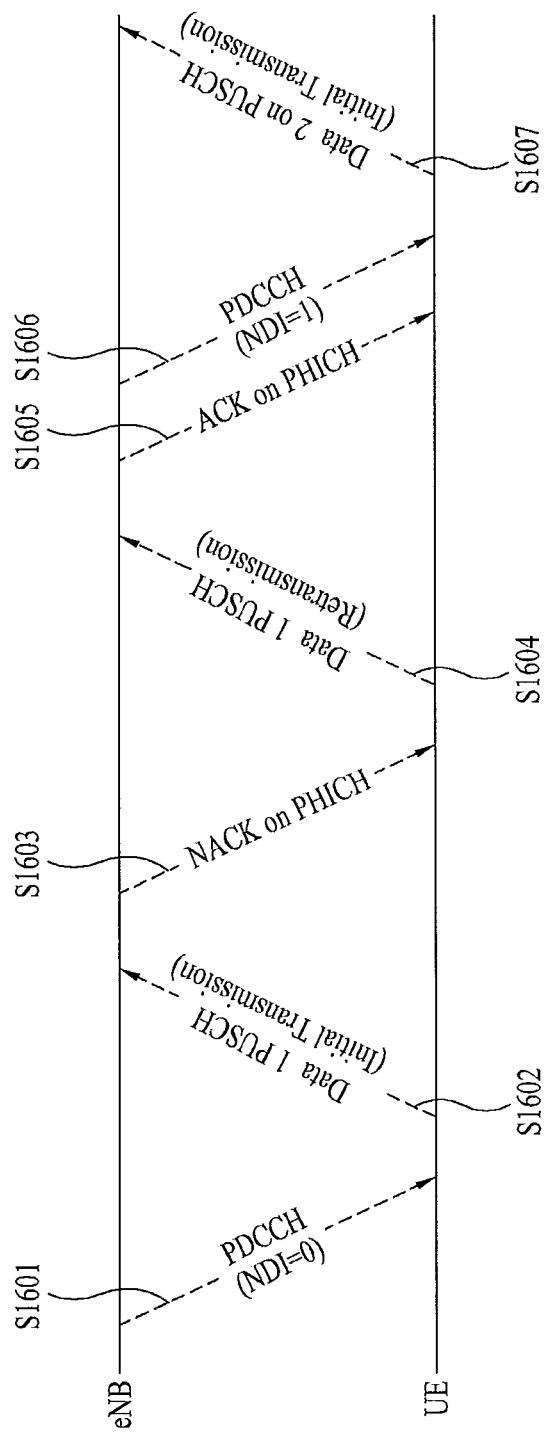
FIG. 16 is a diagram illustrating an uplink HARQ operation defined in the conventional 3GPP LTE system.

A HARQ operation defined in the conventional 3GPP LTE system will be described with reference to FIG. 16.

Uplink (UL) grant information or uplink scheduling information may be transmitted from a base station (eNB) to a UE via a physical downlink control channel (PDCCH) such that the UE may transmit data to the eNB using a HARQ scheme (step S1601). In general, UL scheduling information may include a UE identifier (C-RNTI or semi-persistent scheduling C-RNTI), information about radio resources to be assigned to the UE indicated by the UE identifier (resource block assignment), a transmission parameter (modulation coding scheme (MCS) and redundancy version (RV)), a new data indicator (NDI), etc.

A HARQ entity for managing a HARQ operation is present in a MAC layer of the UE and the HARQ entity may manage a plurality (e.g., eight) of HARQ processes.

The plurality of HARQ processes may be synchronously performed with time. That is, each HARQ process may be synchronously allocated to each TTI. For example, if eight HARQ processes are present, the specific HARQ processes may be sequentially assigned according to data reception time such that a HARQ process 1 is used in TTI 1, a HARQ process 2 is used in TTI 2, . . . , a HARQ process 8 is used in TTI 8, a HARQ process 1 is used in TTI 9 and a HARQ process 2 is used in TTI 10. In addition, each of the plurality of HARQ processes may have an independent HARQ buffer. The synchronous HARQ operation may have a fixed round trip time (RTT). For example, the synchronous HARQ operation may have a retransmission period of 8 TTIs (8 ms).

Since the HARQ processes are synchronously assigned with time as described above, the HARQ entity may receive a PDCCH for initial uplink transmission of specific data and manage the HARQ processes such that a HARQ process associated with the TTI when the PDCCH is received transmits data. For example, if it is assumed that the UE receives a PDCCH including UL scheduling information at an N-th TTI, the UE may transmit data at an (N+4)-th TTI. In other words, a k-th HARQ process assigned to the (N+4)-th TTI may be used to transmit data. The UE may monitor the PDCCH via which the UL scheduling information is transmitted at every TTI, check the received UL scheduling information, and transmit data to the base station via a PUSCH according to the UL scheduling information (step S1602).

The UE may generate data in the form of a MAC protocol data unit (PDU) according to the UL scheduling information, store the data in a HARQ buffer, and transmit the MAC PDU to the base station at a transmission time. Then, the UE may wait for HARQ feedback for MAC PDU transmission from the base station.

The eNB receives the data from the UE, stores the received, and attempts to decode the received data. The eNB may generate an ACK signal if the received signal is successfully decoded and generate a NACK signal if decoding of the received signal fails. The eNB may transmit the generated ACK/NACK signal to the UE. A downlink channel for transmitting HARQ ACK/NACK information of uplink transmission is a physical HARQ indicator channel (PHICH). FIG. 16 shows an example in which the eNB fails to decode the data and transmits the NACK signal (S1603).

If the eNB transmits the HARQ NACK for the MAC PDU, the UE may retransmit the same MAC PDU stored in the HARQ buffer in the same format or a new format (S1604). That is, if the HARQ NACK is received at the N-th TTI, the MAC PDU stored in the HARQ buffer of the HARQ process may be retransmitted at the (N+4)-th TTI. In contrast, if the UE receives the ACK signal from the eNB, the UE may recognize that the data is successfully transmitted to the eNB, transmit next data, and stop HARQ retransmission of the data. The UE does not empty the HARQ buffer even when the ACK signal is received from the eNB.

HARQ retransmission of the UE may be performed in a non-adaptive manner. In the non-adaptive HARQ retransmission operation, data may be retransmitted using the same UL scheduling information as first transmission at a TTI assigned to a next HARQ process. That is, previously used resource block (RB) assignment and MCS and transmission mode may be used for retransmission without change. That is, the PDCCH including the UL scheduling information (UL grant) should be received in initial transmission of specific data, but the PDCCH (UL grant) may not be received in retransmission. Accordingly, if a synchronous and non-adaptive HARQ operation is applied, the eNB may not transmit the PDCCH (UL grant) for retransmission.

Meanwhile, HARQ retransmission of the UE may be performed in an adaptive manner. In this case, a transmission parameter for retransmission is received via a PDCCH and the UL scheduling information included in the PDCCH may be different from that of initial transmission according to channel status. For example, if the channel status of retransmission is better than that of initial transmission, transmission of a higher bit rate may be indicated and, if the channel status of retransmission is worse than that of initial transmission, transmission of a lower bit rate may be indicated.

If the UE receives the UL scheduling information, the UE can determine whether data to be transmitted is data of initial transmission or data of retransmission using an NDI field included in the PDCCH. The NDI field has 1 bit, is toggled in order of 0, 1, 0, 1, 0, . . . whenever new data is transmitted and has the same value as initial transmission in retransmission. That is, the UE may compare the NDI field with a previously transmitted value and determine whether data is retransmitted.

The UE increases the number of times of transmission CURRENT_TX_NB whenever data is transmitted using the HARQ scheme and discards the MAC PDU stored in the HARQ buffer when CURRENT_TX_Nb reaches a maximum number of times of transmission set by a higher layer.

Meanwhile, when the eNB receives the retransmitted data, the eNB may combine the retransmitted data with the data stored in the soft buffer in a state in which decoding fails, attempt to decode the combined data, transmit an ACK signal if decoding is successfully performed, and transmit a NACK signal if decoding fails. The eNB may repeat the process of sending the NACK signal and receiving data again until data decoding is successfully performed. In the example of FIG. 16, the eNB may attempt to decode the data retransmitted in step S1604 in a state of being combined with the data which is previously received and stored. The eNB may transmit the ACK signal to the UE via a PHICH if the received data is successfully decoded (step S1605). In addition, the eNB may transmit UL scheduling information for next data transmission to the UE via the PDCCH in a state of toggling the NDI to 1 (step S1606), in order to indicate this UL scheduling information is not used for adaptive retransmission but is used for new data transmission. Then, the UE may transmit new data to the eNB via the PUSCH corresponding to the received UL scheduling information (step S1607).

The uplink HARQ transmission scheme in the above-described 3GPP LTE system may be considered a basic uplink HARQ transmission scheme in the 3GPP LTE-A system. However, since the conventional uplink HARQ operation scheme is for single-codeword based transmission, the conventional HARQ operation scheme is not applicable to multiple-codeword based transmission without change. Hereinafter, various embodiments of the present invention applicable to the uplink HARQ transmission operation in a system supporting uplink multiple-codeword based transmission (e.g., the 3GPP LTE-A system) will be described.

As described above, if an arbitrary UE performs multiple-codeword based SU-MIMO transmission in uplink, the eNB performs channel decoding on a per codeword basis and determines whether decoding error occurs in an individual codeword through CRC. The eNB may generate ACK/NACK information on a per codeword basis. If rank (the number of transmission layers or transmission streams) is greater than 1 and an uplink SU-MIMO transmission scheme based on two codewords is applied, ACK/NACK information of the two codewords may be transmitted through respective PHICHs, or ACK/NACK information of the two codewords may be transmitted through one PHICH in order to reduce downlink control information transmission load. At this time, since two states of ACK and NACK may be expressed through one PHICH, it is necessary to define a rule of mapping ACK/NACK information of each codeword to the ACK/NACK state on one PHICH upon transmitting multiple codewords. In the present invention, the methods shown in Tables 3 and 4 are proposed as the rule of mapping the ACK/NACK status for transmission of two codewords to the ACK/NACK status on one PHICH.

TABLE 3

| PHICH ACK/ NACK states | Codeword ACK/NACK status (First CW A/N status + Second CW A/N status) |
| --- | --- |
| ACK | ACK + ACK |
|  | ACK + NACK |
|  | NACK + ACK |
| NACK | NACK + NACK |

TABLE 4

| PHICH ACK/ NACK states | Codeword ACK/NACK status (First CW A/N status + Second CW A/N status) |
| --- | --- |
| ACK | ACK + ACK |
| NACK | ACK + NACK |
|  | NACK + ACK |
|  | NACK + NACK |

Tables 3 and 4 show the PHICH ACK/NACK status configuration in the case in which uplink 2-codeword MIMO transmission is applied. In the following description, uplink multiple-codeword MIMO transmission includes uplink multiple-codeword SU-MIMO transmission by one UE or multiple-stream MU-MIMO transmission by a plurality of UEs.

HARQ Operation Scheme 1

A HARQ operation of the case in which the PHICH status is configured as shown in Table 3 will now be described.

The eNB may receive two codewords and retransmission may be performed without the PDCCH (UL grant) only when errors occur in both codewords (NACK+NACK). That is, the UE which receives the PHICH indicating the NACK status from the eNB recognizes that errors occur in both codewords and perform data retransmission without separate UL grant PDCCH.

In other cases (ACK+ACK, ACK+NACK, NACK+ACK), the eNB transmits the UL grant PDCCH to the UE while transmitting the PHICH or when a predetermined time has passed since PHICH transmission and allows the UE to check the ACK+ACK, ACK+NACK or NACK+ACK status depending on whether an NDI which is one of HARQ associated parameters of an individual codeword in the UL grant PDCCH is toggled. The expression "when the predetermined time has passed since PHICH transmission" includes the case in which the UL grant PDCCH is transmitted at a downlink subframe in which the PHICH is transmitted and the same is true for the following description. The UE which receives the PHICH indicating the ACK status from the eNB may not determine in which codeword errors occur or whether errors occur in all codewords but determine whether the codewords are transmitted through the NDI value for each codeword among the control information in the UL grant PDCCH. More specifically, if the NDI value for the codeword is toggled in the UL grant PDCCH, the UE may recognize that previous transmission is performed without error and transmit new data. In contrast, if the NDI value for the codeword is not toggled, the UE may recognize that errors occur in previous transmission and retransmit the previously transmitted data.

HARQ Operation Scheme 2

One HARQ operation scheme of the case in which the PHICH status is configured as shown in Table 4 will now be described.

The eNB may receive two codewords and retransmission may be performed without the UL grant PDCCH with respect to both codewords when errors occur in one of the two codewords (ACK+NACK or NACK+ACK) or when errors occur in both codewords (NACK+NACK). That is, the UE which receives the PHICH indicating the NACK status from the eNB (the PHICH NACK status corresponds to the ACK+NACK, NACK+ACK and NACK+NACK status as shown in Table 4) may retransmit the two codewords without receiving the separate UL grant PDCCH regardless of the ACK or NACK status for an individual codeword. This scheme is referred to as bundled NACK processing.

HARQ Operation Scheme 3

Another HARQ operation scheme of the case in which the PHICH status is configured as shown in Table 4 will now be described.

The eNB may receive two codewords, transmit a PHICH indicating the NACK status when errors occur in one of the two codewords (ACK+NACK or NACK+ACK) or when errors occur in both codewords (NACK+NACK) and transmit the UL grant PDCCH for determining whether the ACK/NACK status of the two codewords is ACK+NACK, NACK+ACK or NACK+NACK simultaneously to PHICH transmission or after a predetermined offset. Such an operation is different from the case in which the PHICH indicating the NACK status is transmitted but the UL grant PDCCH is not transmitted in the conventional HARQ operation (see FIG. 16). Alternatively, while the PHICH indicating the NACK status is transmitted, the UL grant PDCCH indicating the detailed ACK/NACK status may be transmitted in all cases of ACK+NACK, NACK+ACK and NACK+NACK or only in case of ACK+NACK or NACK+ACK. In addition, the transmission time of the UL grant PDCCH indicating the detailed ACK/NACK status while the PHICH indicating the NACK status is transmitted may be the same subframe as the PHICH transmission subframe or a subframe determined according to a predetermined offset from the PHICH transmission frame.

Hereinafter, various embodiments of the present invention for the HARQ operation schemes 1, 2 and 3 described with reference to Tables 3 and 4 will be described in detail. Embodiments 1 to 3 (including Embodiments 3-1 to 3-3) are based on the HARQ operation scheme 1 described with reference to Table 3, Embodiment 4 is based on the HARQ operation scheme 2 described with reference to Table 4, Embodiments 5 and 6 are based on the HARQ operation scheme 3 described with reference to Table 4, and Embodiments 7 and 8 are applicable to all the HARQ operation schemes 1 to 3 described with reference to Tables 3 and 4.

Embodiment 1

Embodiment 1 relates to details of the HARQ operation scheme 1 described with reference to Table 3.

Figure 17:
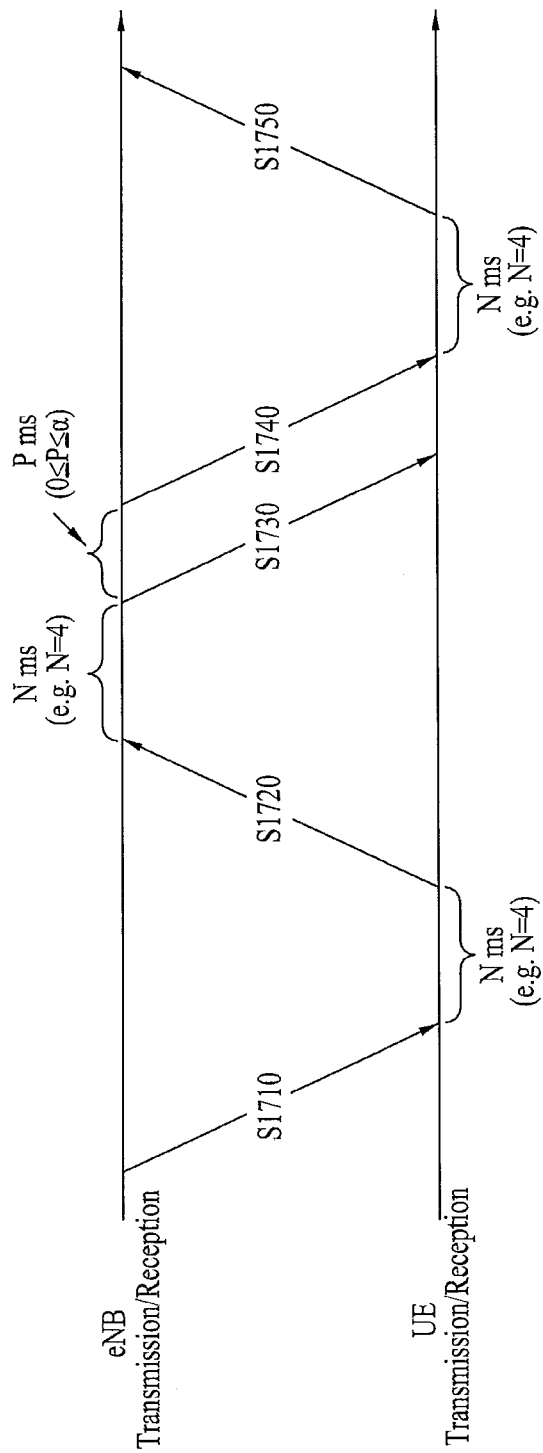
FIG. 17 is a diagram showing a HARQ procedure based on a HARQ operation scheme 1 of the present invention.

FIG. 17 is a diagram showing a HARQ procedure based on the HARQ operation scheme 1 of the present invention. The steps of FIG. 17 will now be described in detail.

In steps S1710, in order to perform uplink data (PUSCH) transmission using an uplink multiple-codeword MIMO transmission scheme with a rank value of 1 or more, an eNB may transmit a UL grant PDCCH to an UE (e.g., an UE which operates in the 3GPP LTE-A system).

In step S1720, the UE may transmit a PUSCH to the eNB using an uplink MIMO transmission scheme precoded according to the rank value of 1 or more according to downlink control information (DCI) of the UL grant PDCCH received in step S1710. A time when the UE transmits the PUSCH to the eNB may be set to a time when N TTIs (N ms) have passed since the UE receives the UL grant PDCCH from the eNB. For example, N is 4.

In step S1730, a single downlink PHICH indicating the ACK/NACK status of multiple codewords may be transmitted from the eNB to the UE according to the rule of Table 3. A time when the eNB transmits the single PHICH may be set to a time when N TTIs (N ms) have passed since the eNB receives the PUSCH from the UE. For example, N is 4.

Step S1740 may be performed only when the single PHICH status is ACK. That is, the eNB may transmit the UL grant PDCCH while transmitting the PHICH indicating the ACK status. If the PHICH indicating the ACK status is signaled, a time when the UL grant PDCCH is transmitted (that is, a time when step s1740 is performed) may be set to a time when P TTIs (P ms) have passed since the eNB transmits the single PHICH to the UE. The P value is a subframe offset value from a PHICH transmission downlink subframe and may have a value of $0 \leq P \leq \alpha$. $\alpha$ may be predetermined natural number.

The UL grant PDCCH of step S1740 may be transmitted in order to set resources and a transmission mode (transmission scheme) for new data transmission if the ACK/NACK status for the two codewords is ACK+ACK, ACK+NACK or NACK+ACK. If individual NDI information is defined in a DCI format with respect to previous transmission of two codewords (that is, if NDI information is defined in the DCI format of the UL grant PDCCH of step S1710), it is possible to indicate which codeword corresponds to an ACK status or a NACK status by toggling the NDI value in the DCI format of the UL grant PDCCH of step S1740. The UE may receive the PHICH indicating the ACK status in step S1730 and determine whether the NDI value of the DCI format of the UL grant PDCCH received in step S1740 is toggled. If the NDI is toggled, the UE may determine that new data is transmitted and thus flush the retransmission buffer. If the NDI is not toggled, the UE may retransmit the codewords according to the resources and the transmission mode set in the UL grant PDCCH of step S1740. The DCI format of the UL grant PDCCH of step S1740 may include an NDI, RV and/or HARQ process number field defined per codeword (or per transport block), similarly to the UL grant PDCCH of initial transmission (that is, step S1710). In addition, the DCI format of the UL grant PDCCH of step S1740 may maintain the same format as the UL grant PDCCH of initial transmission (that is, step S1710).

Meanwhile, if the PHICH has the NACK status, UL grant PDCCH transmission of step S1740 may not be defined and retransmission may be performed according to the synchronous non-adaptive HARQ operation. That is, if the PHICH has the NACK status, the UE may perform retransmission at HARQ retransmission timing without receiving the UL grant PDCCH.

In step S1750, the UE may transmit a new PUSCH or retransmit the PUSCH according to the ACK/NACK status of previous PUSCH transmission.

Embodiment 2

Embodiment 2 is a modified example of Embodiment 1. In the description of Embodiment 2, a repeated description of Embodiment 1 will be omitted for clarity.

According to Embodiment 2, for example, in uplink 2-codeword MIMO transmission, the eNB may inform the UE of the ACK/NACK status of each codeword by toggling the NDI value defined with respect to each codeword in the DCI format of the UL grant PDCCH, not the PHICH, when the eNB receives the two codewords. That is, Embodiment 2 is similar to Embodiment 1 except that the single downlink PHICH of step 1730 of Embodiment 1 is not transmitted but the UL grant PDCCH of step S1740 is transmitted in all ACK/NACK statuses (that is, ACK+ACK, ACK+NACK, NACK+ACK and NACK+NACK). The UE may not decode the PHICH after uplink 2-codeword MIMO PUSCH transmission and may perform PDCCH blind decoding while waiting for UL grant PDCCH reception at a downlink subframe of a predetermined time (e.g., after 4 ms or at a downlink subframe after four subframes from PUSCH transmission) or at a plurality of downlink subframes of a predetermined range.

The transmission time of the UL grant PDCCH which can indicate the ACK/NACK information for uplink multiple codewords may be set to an arbitrary downlink subframe according to Embodiment 2 or may be set to downlink subframe timing when the PHICH is transmitted in step S1730 of Embodiment 1 when considering the whole HARQ RTT.

According to the present embodiment, the UE which performs 2-codeword uplink MIMO transmission may receive the UL grant PDCCH from the eNB when a predetermined time (e.g., 4 subframes (=4 ms)) has passed after the UE transmits the PUSCH to the eNB and acquire the ACK/NACK information of the codewords through toggling of the NDI of the individual codeword in the DCI format of the UL grant PDCCH. Then, the UE may flush the retransmission buffer and transmit new data with respect to the codeword having the ACK status (that is, the transport block in which the NDI value is toggled) and perform retransmission with respect to the codeword having the NACK status (that is, the transport block in which the NDI value is not toggled).

Embodiment 3

When the UE receives the ACK/NACK information for the uplink multiple-codeword transmission from the eNB, the UE may misrecognize that the ACK information is received even when the eNB transmits the NACK information. This is referred to as a NACK-to-ACK error state.

For example, in the HARQ operation of Embodiment 1, it may be assumed that the UE misrecognizes the PHICH indicating the NACK status, which is transmitted by the eNB in step S1730, as the ACK status due to errors of the reception operation of the UE. In this case, since the UE recognizes that the PHICH indicating the ACK status is received in step S1730, the UE waits for the UL grant PDCCH of step S1740. However, since the eNB transmits the PHICH indicating the NACK status, the eNB may expect that the UE performs PUSCH retransmission at a predetermined time even when a separate UL grant PDCCH is not transmitted, and continue to decode the uplink signal. In this case, the eNB may misrecognize that uplink data retransmission is performed even when an uplink signal is not transmitted such that errors occur in a subsequent operation. Schemes for solving such a problem will now be described.

Embodiment 3-1

If the UE waits for the UL grant PDCCH and the eNB waits for the PUSCH due to the NACK-to-ACK error, the eNB which determines that PUSCH transmission from the UE is not performed for a predetermined time may transmit the PHICH indicating the NACK status in a predefined downlink subframe. At this time, the UE may attempt to receive the PHICH in the predefined downlink subframe before the UL grant PDCCH associated with the PHICH is received, even when the PHICH indicating the ACK status is received (because the UE may misrecognize that the PHICH indicating the ACK status is received due to the NACK-to-ACK error). The predefined downlink subframe in which the PHICH is transmitted is predetermined between the eNB and the UE.

Embodiment 3-2

If the UE waits for the UL grant PDCCH and the eNB waits for the PUSCH due to the NACK-to-ACK error, the eNB which determines that PUSCH transmission from the UE is not performed for a predetermined time may transmit the UL grant PDCCH in which the NDI value for the individual codeword is not toggled as compared to previous transmission in a predefined downlink subframe. At this time, the UE may decode the UL grant PDCCH, determine that the NDI value for the individual codeword is not toggled, and retransmit the previously transmitted PUSCH.

Embodiment 3-3

As another method of solving the problem of the case in which the UE waits for the UL grant PDCCH and the eNB waits for the PUSCH due to the NACK-to-ACK error, the modified example of Embodiment 1 is applicable. While the UL grant PDCCH of step S1740 is not transmitted when the PHICH of step S1730 has the NACK state in Embodiment 1, the UL grant PDCCH in which the NDI for the individual codeword is not toggled may be transmitted to the UE when $P$ $(0 \leq P \leq \alpha)$ subframes has passed since the PHICH is transmitted, even when the eNB transmits the PHICH indicating the NACK status in Embodiment 3-3. If the UL grant PDCCH is provided while the PHICH is transmitted, even when the UE misrecognizes the PDICH indicating the NACK status as the ACK status, it is possible to retransmit the codeword in which the NDI value is not toggled in the UL grant PDCCH.

Embodiment 4

Embodiment 4 relates to details of the HARQ operation scheme 2 described with reference to Table 4.

Figure 18:
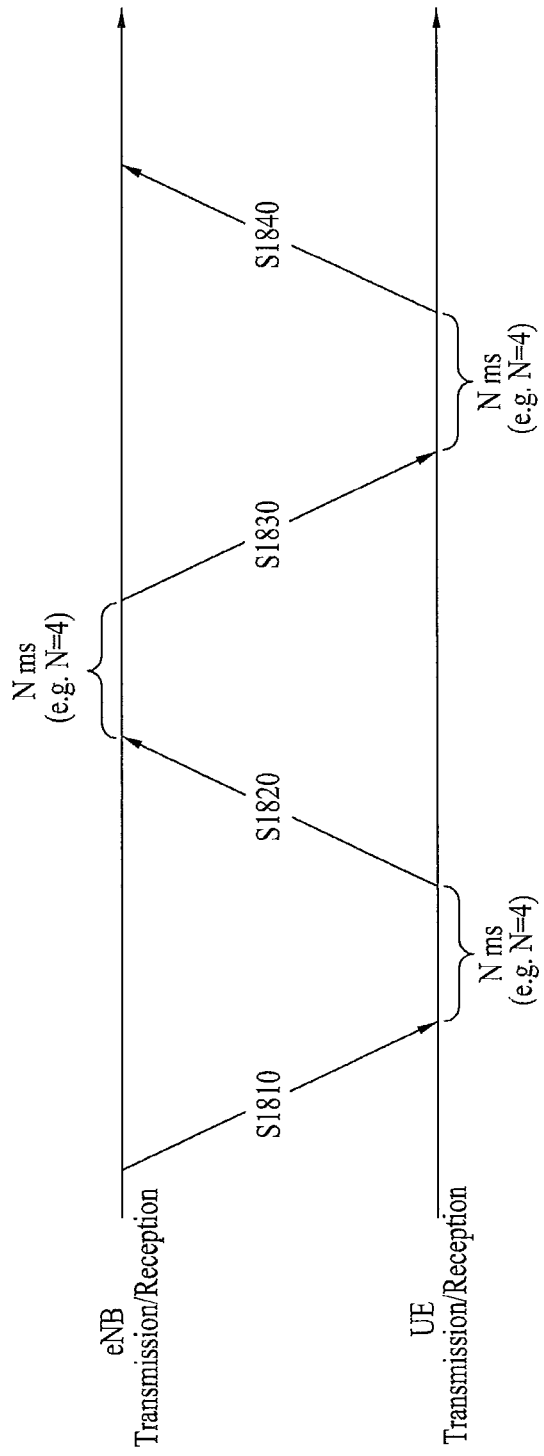
FIG. 18 is a diagram showing a HARQ procedure based on a HARQ operation scheme 2 of the present invention.

FIG. 18 is a diagram showing a HARQ procedure based on the HARQ operation scheme 2 of the present invention. The steps of FIG. 18 will now be described in detail.

In steps S1810, in order to perform uplink data (PUSCH) transmission using an uplink multiple-codeword MIMO transmission scheme with a rank value of 1 or more, an eNB may transmit a UL grant PDCCH to a UE (e.g., a UE which operates in the 3GPP LTE-A system).

In step S1820, the UE may transmit a PUSCH to the eNB using an uplink MIMO transmission scheme precoded according to the rank value of 1 or more according to downlink control information (DCI) of the UL grant PDCCH received in step S1810. A time when the UE transmits the PUSCH to the eNB may be set to a time when N TTIs (N ms) have passed since the UL grant PDCCH is received from the eNB. For example, N is 4.

In step S1830, a single downlink PHICH indicating the ACK/NACK status of multiple codewords may be transmitted from the eNB to the UE according to the rule of Table 4. A time when the eNB transmits the single PHICH may be set to a time when N TTIs (N ms) have passed since the eNB receives the PUSCH from the UE. For example, N is 4.

The UE which receives the PHICH indicating the ACK status in step S1830 may flush the retransmission buffer and perform new PUSCH transmission upon receiving a subsequent UL grant PDCCH. In contrast, the UE which receives the PHICH indicating the NACK status in step S1830 may recognize bundled NACK and retransmit the two codewords regardless of the ACK or NACK status of the individual codeword. The eNB which receives such retransmission may ignore the retransmitted codeword part with respect to the codeword in which errors do not occur and decode the codeword in which errors occur in previous transmission.

In step S1840, the UE may transmit a new PUSCH or retransmit the PUSCH according to the ACK/NACK status of previous PUSCH transmission.

In Embodiment 4, it is possible to simplify the HARQ operation by retransmitting the two codewords regardless of whether the eNB successfully decodes the individual codeword if the bundled NACK on the PHICH is received.

Embodiment 5

Embodiment 5 relates to details of the HARQ operation scheme 3 described with reference to Table 4.

Figure 19:
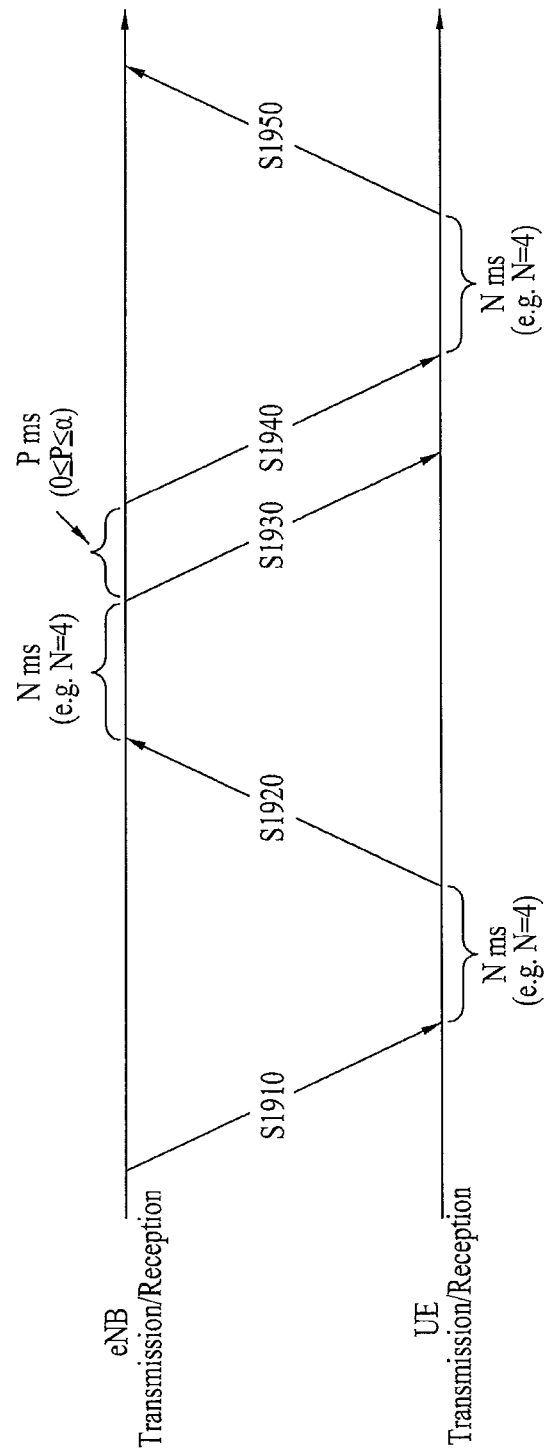
FIG. 19 is a diagram showing a HARQ procedure based on a HARQ operation scheme 3 of the present invention.

FIG. 19 is a diagram showing a HARQ procedure based on the HARQ operation scheme 3 of the present invention. The steps of FIG. 19 will now be described in detail.

In steps S1910, in order to perform uplink data (PUSCH) transmission using an uplink multiple-codeword MIMO transmission scheme with a rank value of 1 or more, an eNB may transmit a UL grant PDCCH to a UE (e.g., a UE which operates in the 3GPP LTE-A system).

In step S1920, the UE may transmit a PUSCH to the eNB using an uplink MIMO transmission scheme precoded according to the rank value of 1 or more according to downlink control information (DCI) of the UL grant PDCCH received in step S1910. A time when the UE transmits the PUSCH to the eNB may be set to a time when N TTIs (N ms) have passed since the UL grant PDCCH is received from the eNB. For example, N is 4.

In step S1930, a single downlink PHICH indicating the ACK/NACK status of multiple codewords may be transmitted from the eNB to the UE according to the rule of Table 4. A time when the eNB transmits the single PHICH may be set to a time when N TTIs (N ms) have passed since the eNB receives the PUSCH from the UE. For example, N is 4.

In step S1940, the eNB may transmit the UL grant PDCCH in addition to PHICH transmission of step S1930. The UL grant PDCCH of step S1940 may be transmitted when the PHICH of step S1930 has the ACK state and the NACK state (that is, all ACK/NACK statuses of the two codewords (that is, ACK+ACK, ACK+NACK, NACK+ACK and NACK+NACK)). If the PHICH is signaled, a time when the UL grant PDCCH is transmitted (that is, a time when step S1940 is performed) may be set to a time when P TTIs (P ms) have passed after the eNB transmits the single PHICH to the UE. The P value is a subframe offset value from a PHICH transmission downlink subframe and may have a value of $0 \leq P \leq \alpha$. $\alpha$ may be a predetermined natural number.

The UL grant PDCCH of step S1940 may be transmitted in order to set resources and a transmission mode (transmission scheme) for new data transmission if the PHICH of step S1930 has the ACK status (if the ACK/NACK status for the two codewords is ACK+ACK). The UE may flush the retransmission buffer and prepare for new data transmission upon receiving the PHICH indicating the ACK status in step S1930 and toggling the NDI value of the DCI format of the UL grant PDCCH received in step S1940.

If the PHICH of step S1930 has the NACK status, the UL grant PDCCH of step S1940 may be transmitted for the purpose of informing the UE of the ACK/NACK status for the individual codeword (that is, ACK+NACK, NACK+ACK or NACK+NACK for the two codewords). If the individual NDI information for previous 2-codeword transmission is defined in the DCI format (that is, if the NDI information is defined in the DCI format of the UL grant PDCCH of step S1910), it is possible to indicate which codeword corresponds to the ACK or NACK status through toggling of the NDI value of the DCI format of the UL grant PDCCH of step S1940. The UE may receive the PHICH indicating the NACK status in step S1930 and determine whether the NDI value of the DCI format of the UL grant PDCCH received in step S1940 is toggled. If the NDI is toggled, the UE may determine that new data is instructed to be transmitted and thus flush the retransmission buffer. If the NDI is not toggled, the UE may retransmit the codewords according to the resources and the transmission mode set in the UL grant PDCCH of step S1940. The DCI format of the UL grant PDCCH of step S1940 may include the NDI, RV and/or HARQ process number field defined on a per individual codeword (or transport block) basis, similarly to the UL grant PDCCH of initial transmission (that is, step S1910). In addition, the DCI format of the UL grant PDCCH of step S1940 may maintain the same format as the UL grant PDCCH of initial transmission (that is, step S1910).

In step S1950, the UE may transmit a new PUSCH or retransmit the PUSCH according to the ACK/NACK status of previous PUSCH transmission.

Embodiment 6

Embodiment 6 is a modified example of Embodiment 5. In the description of Embodiment 6, a repeated description of Embodiment 5 will be omitted for clarity.

According to Embodiment 6, for example, in uplink 2-codeword MIMO transmission, the eNB may inform the UE of the ACK/NACK status of each codeword by toggling the NDI value defined with respect to each codeword in the DCI format of the UL grant PDCCH, not the PHICH, when the eNB receives the two codewords. That is, Embodiment 6 is similar to Embodiment 5 except that the single downlink PHICH of step 1930 of Embodiment 1 is not transmitted but the UL grant PDCCH of step S1940 is transmitted. The UE may not decode the PHICH after uplink 2-codeword MIMO PUSCH transmission and may perform PDCCH blind decoding while awaiting UL grant PDCCH reception at a downlink subframe of a predetermined time (e.g., after 4 ms or at a downlink subframe after four subframes from PUSCH transmission) or at a plurality of downlink subframes of a predetermined range.

The transmission time of the UL grant PDCCH which can indicate the ACK/NACK information for multiple uplink codewords may be set to an arbitrary downlink subframe according to Embodiment 6 or may be set to downlink subframe timing when the PHICH is transmitted in step S1930 of Embodiment 5 when considering the whole HARQ RTT.

According to the present embodiment, the UE which performs uplink 2-codeword MIMO transmission may receive the UL grant PDCCH from the eNB when a predetermined time (e.g., 4 subframes (=4 ms)) has passed after the UE transmits the PUSCH to the eNB and acquire the ACK/NACK information of the codewords through toggling of the NDI of the individual codeword in the DCI format of the UL grant PDCCH. Then, the UE may flush the retransmission buffer and transmit new data with respect to the codeword having the ACK status (that is, the transport block in which the NDI value is toggled) and perform retransmission with respect to the codeword having the NACK status (that is, the transport block in which the NDI value is not toggled).

Embodiment 7

Embodiment 7 is applicable to the HARQ operation schemes 1 to 3 described with reference to Tables 3 and 4.

In Embodiments 1 to 6, when the UE performs uplink multiple-codeword MIMO transmission, if the PHICH ACK/NACK status is configured as shown in Table 3, the UE which detects the PHICH indicating the ACK status may determine whether the ACK/NACK status of the two codewords is ACK+ACK, ACK+NACK or NACK+ACK through the NDI field of the individual code in the DCI format of the UL grant PDCCH, and, if the PHICH ACK/NACK status is configured as shown in Table 4, the UE which detects the PHICH indicating the NACK status may determine whether the ACK/NACK status of the two codewords is ACK+NACK, NACK+ACK or NACK+NACK through the NDI field of the individual code in the DCI format of the UL grant PDCCH. Alternatively, as in Embodiment 2 or 6, the PHICH for uplink multiple-codeword MIMO transmission may not be transmitted but a determination as to whether the ACK/NACK status for the uplink multiple-codeword transmission is ACK+ACK, ACK+NACK, NACK+ACK or NACK+NACK is made using the NDI field defined with respect to the individual codeword in the DCI format of the UL grant PDCCH.

Unlike the embodiments in which the UL grant PDCCH is transmitted while transmitting the PHICH or without transmitting the PHICH and the two NDI fields are defined in the DCI format of the UL grant PDCCH so as to determine the ACK/NACK status of the individual codeword using the NDI fields, in Embodiment 7, the UL grant PDCCH may be transmitted while transmitting the PHICH or without transmitting the PHICH, only one NDI field may be used and defined in the DCI format of the UL grant PDCCH, and the ACK/NACK status of the individual codeword may be indicated together with a specific field which is not used upon multiple-codeword (e.g., 2-codeword) transmission. Alternatively, in Embodiment 7, the UL grant PDCCH may be transmitted while transmitting the PHICH or without transmitting the PHICH and, if a specific field which is not used upon multiple-codeword (e.g., 2-codeword) transmission includes a plurality of bits, the ACK/NACK status of the individual codeword may be indicated using the specific field. Hereinafter, an example of using a "hopping flag" field or "transmit power control (TPC)" field as a field used to indicate the ACK/NACK status of the individual codeword will be described.

The "hopping flag" field may be defined in the DCI format of the UL grant PDCCH. The hopping flag field is 1 bit and has a function indicating an uplink operation hopping to another frequency resource region by applying a slot boundary hopping mirroring or predetermined rule in an arbitrary uplink subframe. Since such a hopping operation is applicable upon uplink SU-MIMO or MU-MIMO transmission of rank 1, the hopping flag field may be defined in the DCI format of the UL grant PDCCH. However, upon uplink SU-MIMO or MU-MIMO transmission of rank of 2 or more, uplink diversity transmission such as the hopping operation may not be applied. Accordingly, in case of uplink multiple-codeword transmission, in general, the hopping flag field may not be used in the DCI format of the UL grant PDCCH. However, in Embodiment 7, the ACK/NACK status of the individual codeword may be indicated using one NDI field defined in the DCI format of the UL grant PDCCH and the hopping flag field. That is, 2-bit information (that is, four states) may be indicated using the NDI field (1 bit) and the hopping flag field (1 bit). At this time, if the PHICH ACK/NACK status is configured as shown in Table 3, three ACK/NACK statuses (ACK+ACK, ACK+NACK and NACK+ACK) may be indicated using the NDI field and the hopping flag field and, if the PHICH ACK/NACK status is configured as shown in Table 4, three ACK/NACK statuses (ACK+NACK, NACK+ACK and NACK+NACK) may be indicated using the NDI field and the hopping flag field. Alternatively, one NDI field may be used to determine whether one codeword is newly transmitted or retransmitted and the hopping flag may be used to determine whether another codeword is newly transmitted or retransmitted. In this case, the UE which receives the NDI and the hopping flag may recognize the ACK status if new transmission of the codeword is indicated and recognize the NACK status if codeword retransmission is indicated. As another embodiment, in case of Table 3, a method of toggling the NDI only in case of ACK+ACK and distinguishing between ACK+NACK and NACK+ACK through the value of the hopping flag field in a state in which the NDI is not toggled is applicable. In case of Table 4, a method of toggling the NDI only in case of ACK+NACK or NACK+ACK and distinguishing between ACK+NACK and NACK+ACK through the value of the hopping flag field when the NDI is toggled is applicable.

Meanwhile, the "transmit power control (TPC) command" field may be defined in the DCI format of the UL grant PDCCH. The TPC command field has 2 bits and includes information about uplink power control command for PUSCH transmission. That is, the TPC command field in the DCI format may indicate increase or decrease in uplink transmit power by a predetermined level. Such a TPC command may be used for a new purpose in the UL grant PDCCH DCI format for uplink multiple-codeword SU-MIMO or MU-MIMO transmission. For example, if additional information is unnecessary for interpreting the ACK/NACK status of the individual codeword indicated by the PHICH, that is, if the PHICH is configured as shown in Table 3 and the PHICH indicates the NACK status or if the PHICH is configured as shown in Table 4 and the PHICH indicates the ACK status, the TPC command field may perform the original function (uplink transmit power control) and, if the PHICH has the other state, the TPC command field may perform the function indicating the ACK/NACK status of the individual codeword. At this time, the three ACK/NACK statuses (ACK+ACK, ACK+NACK and NACK+ACK in case of Table 3 or ACK+NACK, NACK+ACK and NACK+NACK in case of Table 4) may be indicated using one NDI field and TPC command field defined in the DCI format of the UL grant PDCCH, and one NDI field (1 bit) and one bit of the 2-bit TPC command field may be used. One bit of the 2-bit TPC command field means one of one most significant bit and one least significant bit. Alternatively, one NDI field may be used to determine whether one codeword is newly transmitted or retransmitted and one bit of the 2-bit TPC command field may be used to determine whether another codeword is newly transmitted or retransmitted. Alternatively, the ACK/NACK status of the two codewords or the new transmission/retransmission of each codeword may be indicated using 2 bits (that is, four states) of the TPC command field. As another embodiment, in case of Table 3, a method of toggling the NDI only in case of ACK+ACK and distinguishing between ACK+NACK and NACK+ACK through the value of the specified bit of the TPC command field in a state in which the NDI is not toggled is applicable. In case of Table 4, a method of toggling the NDI only in case of ACK+NACK or NACK+ACK and distinguishing between ACK+NACK and NACK+ACK through the value of the specified bit of the TPC command field when the NDI is toggled is applicable.

Embodiment 8

In Embodiment 8, the detailed operation according to the status of the transmission buffer of the codeword (or the transport block) in the application of the above-described embodiments will be described. For example, the operation of Embodiment 8 is described based on Embodiment 1, but the present invention is not limited thereto and the same principle is applicable to the other embodiments (e.g., Embodiments 2 to 7).

In Embodiment 1, the methods of indicating the ACK/NACK status of the individual codeword using the information about the UL grant PDCCH transmitted simultaneously with transmission of the single PHICH or after a predetermined time in uplink multiple-codeword MIMO transmission were described. In Embodiment 1, if one or more of two codewords corresponds to ACK, the PHICH indicates the ACK status and the ACK/NACK status of the codeword may be indicated depending on whether the codeword is newly transmitted or retransmitted through the information about the UL grant PDCCH (e.g., NDI field).

At this time, in previous uplink 2-codeword transmission, if first codeword transmission has the ACK status, second codeword transmission has the NACK status and the transmission buffer of the first codeword is empty, unnecessary uplink transmission may be performed if the transmission buffer state is not considered. The transmission buffer temporarily stores data to be transmitted later with respect to the codeword (or the transport block) and is different from the buffer for storing data for retransmission of previously transmitted data. The first and second codewords refer to two arbitrary codewords and there is no difference even when the order thereof is changed. That is, in previous uplink 2-codeword transmission, the first codeword transmission has the NACK status, the second codeword transmission has the ACK status and the transfer buffer of the second codeword is empty, the transmission buffer states may be considered according to the present invention.

More specifically, in the case in which the PHICH of the ACK status for the uplink multiple-codeword MIMO transmission is transmitted to the UE and the UL grant PDCCH is transmitted in order to indicate the complete information of the ACK/NACK status of the individual codeword, when the NDI field of a specific codeword (or a specific transport block) is toggled to indicate new transmission, the UE may determine that the previously transmitted specific codeword is accurately received from the eNB (that is, the ACK status) and transmit new data with respect to the codeword. At this time, it may be assumed that there is no more data to be transmitted because the transmission buffer of the UE for the codeword is empty. Even in this case, the UE transmits dummy data with respect to the codeword according to frequency resources and a transmission scheme indicated by the UL grant PDCCH. In this case, since unnecessary uplink transmission resources are used and UE power is consumed, a method of solving this problem is proposed as follows.

The UE which performs uplink multiple-codeword MIMO transmission may multiplex information indicating "buffer empty" with uplink data (that is, piggyback on the PUSCH resources) just before the state in which the transmission buffer of an arbitrary codeword is empty and transmit the information to the eNB. If the information indicating the ACK status of the codeword is included in the UL grant PDCCH transmitted by the eNB in order to indicate the ACK/NACK status of the individual codeword with respect to uplink multiple-codeword MIMO transmission, the UE may not perform uplink transmission with respect to the codeword (or the transport block) even when receiving the UL grant PDCCH. In addition, the eNB which receives the "buffer empty" information transmitted in a state of piggybacking on the uplink data may not await uplink transmission of the codeword (or the transport block) if the codeword having the ACK state has the "buffer empty" state, even when the UL grant PDCCH indicating the ACK/NACK status of the individual codeword is transmitted to the UE.

The method of enabling the "buffer empty" information of the transmission buffer of an arbitrary codeword to piggyback on uplink data at the UE will now be described. For example, in the MAC PDU of the uplink data, a radio link control (RLC) packet data channel (PDCH) of data and the "buffer empty" information may be multiplexed. This may be referred to as predetermined MAC messaging. Alternatively, a field indicating the "buffer empty" status may be defined in an MAC header. For example, a 2-bit codeword buffer empty indicator may be defined. Alternatively, a UE-specific radio resource control (RRC) message may be configured such that the "buffer empty" information may be transmitted via the PUSCH.

As described above, as the method of enabling the UE to transmit the "buffer empty" information to the eNB and the method of applying the "buffer empty" information independently or together, an indicator confirming that the "buffer empty" information is accurately received may be defined in the UL grant PDCCH transmitted after the eNB receives the "buffer empty" information.

The indicator may have a function for preventing the UE from recognizing the UL grant PDCCH, which transmitted by the eNB in order to indicate the ACK/NACK status of the individual codeword, as the UL grant PDCCH for new data transmission, with respect to an arbitrary codeword in which ACK is generated in previous transmission and there is no data to be transmitted later. In addition, the indicator may be explicitly indicated in a new field in the UL grant PDCCH transmitted by the eNB in order to indicate the ACK/NACK status of the individual codeword or may be implicitly indicated as an unused state in an unused field, an unused bit or an arbitrary field in the UL grant PDCCH. For example, the indicator may directly indicate whether the buffer empty state of an arbitrary codeword is confirmed using 2 bits of the UL grant PDCCH. Alternatively, the indicator may indicate whether the buffer empty state is confirmed using 1 bit of the UL grant PDCCH. That is, the indicator may implicitly indicate that the buffer empty state of the codeword having the ACK status (indicated through the state of the NDI field or an arbitrary field) is confirmed.

Figure 20:
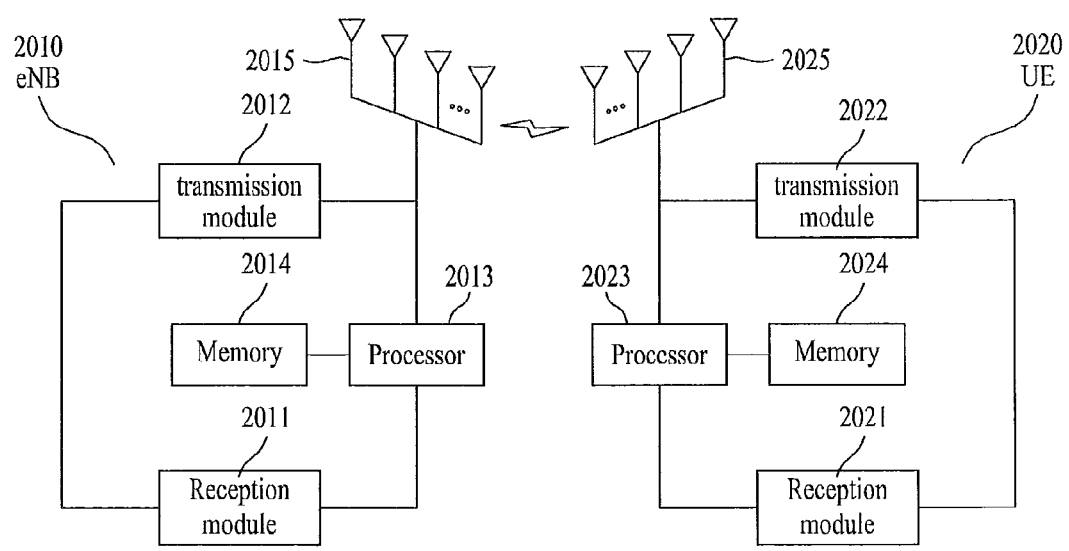
FIG. 20 is a diagram showing the configuration of a preferred embodiment of a base station and a UE.

FIG. 20 is a diagram showing the configuration of a preferred embodiment of an eNB and a UE according to the present invention.

The eNB 2010 according to the present invention may include a reception module 2011, a transmission module 2012, a processor 2013, a memory 2014 and a plurality of antennas 2015. The reception module 2011 may receive a variety of data and control signals from an external device (e.g., the UE). The transmission module 2012 may transmit a variety of data and control signals to an external device (e.g., the UE). The processor 2013 is communicatively connected to various components configuring the eNB 2010, such as the reception module 2011, the transmission module 2012 and the memory 2014, and may control the overall operation of the components. The eNB 2010 can support MIMO transmission/reception using a plurality of antennas 2015.

The eNB according to the present invention may be configured to receive uplink multiple-codeword HARQ transmission. The processor 2013 of the eNB may be configured to receive first and second codewords from the UE 2020 through the reception module 2011 and to receive information about the transmission buffer state of the first and second codewords. The information about the transmission buffer state may indicate that the transmission buffer of the codeword is empty. The processor 2013 of the eNB may be configured to transmit downlink control information (DCI) including ACK/NACK information of the first and second codewords through the transmission module 2012. The DCI may be transmitted via the UL grant PDCCH and the ACK/NACK information of the first and second codewords may be indicated via the NDI field of the UL grant PDCCH DCI format. In addition, the processor 2013 of the eNB may be configured to receive retransmission of the codeword corresponding to NACK. The codeword corresponding to ACK may be set not to be transmitted from the UE if the transmission buffer is empty.

The processor 2013 of the eNB serves to process information received by the eNB and information to be transmitted to an external device. The memory 2014 may store the processed information for a predetermined time and may be replaced with a component such as a buffer (not shown).

Although the eNB 2010 is described as an uplink receiver in FIG. 20, the above description is equally applicable to a relay node (RN) serving as an uplink receiver.

The UE 2020 may include a reception module 2021, a transmission module 2022, a processor 2023, a memory 2024 and an antenna 2025. The reception module 2021 may receive a variety of data and control signals from an external device (e.g., the eNB). The transmission module 2022 may transmit a variety of data and control signals to an external device (e.g., the eNB). The processor 2023 is communicatively connected to various components configuring the UE 2020, such as the reception module 2021, the transmission module 2022 and the memory 2024, and may control the overall operation of the components. The UE 2020 can support MIMO transmission/reception using a plurality of antennas 2025.

The UE 2020 according to the embodiment of the present invention may be configured to perform uplink multiple-codeword HARQ transmission. The processor 2023 of the UE may be configured to transmit first and second codewords via the transmission module 2022 and to transmit information about the transmission buffer state of the first and second codewords to the eNB 2010. The information about the transmission buffer state may indicate that the transmission buffer of the codeword is empty. The processor 2023 of the UE may be configured to receive downlink control information (DCI) including ACK/NACK information of the first and second codewords through the reception module 2021. The DCI may be transmitted via the UL grant PDCCH and the ACK/NACK information of the first and second codewords may be indicated via the NDI field of the UL grant PDCCH DCI format. In addition, the processor 2023 of the UE may be configured to retransmit the codeword corresponding to NACK and not to transmit the codeword corresponding to ACK to the eNB if the transmission buffer is empty.

The processor 2023 of the UE serves to process information received by the UE and information to be transmitted to an external device. The memory 2024 may store the processed information for a predetermined time and may be replaced with a component such as a buffer (not shown).

Although the UE 2020 is described as an uplink transmitter in FIG. 20, the above description is equally applicable to a relay node (RN) serving as an uplink transmitter.

Although the repeated parts of the configurations of the eNB and the UE according to the various embodiments of the present invention will be omitted for clarity in the eNB and the UE of FIG. 20, the eNB and UE for performing the various embodiments (Embodiments 1 to 8) of the present invention can be implemented.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of performing uplink multiple-codeword hybrid automatic repeat request (HARQ) transmission, the method comprising:
    transmitting, at a user equipment, first and second codewords to a base station;
    transmitting information about transmission buffer states of the first and second codewords to the base station;
    receiving downlink control information (DCI) including acknowledgement (ACK)/negative acknowledgement (NACK) information for each of the first and second codewords from the base station, wherein the ACK/NACK information is obtained by decoding a Physical Downlink Control Channel (PDCCH) without decoding a Physical HARQ Indication Channel (PHICH); and
    retransmitting a codeword corresponding to NACK,
    wherein, when receiving the DCI including control information for scheduling a new uplink transmission for the codeword corresponding to ACK, a codeword corresponding to ACK is not transmitted to the base station when the transmission buffer for the codeword corresponding to ACK is empty, and
    wherein the transmission buffer of the user equipment is for temporarily storing data to be transmitted for each of the first and second codewords and is different from a HARQ buffer being used by the user equipment for storing data for a retransmission of previously transmitted data.

2. The method according to claim 1, wherein:
    if the information about the transmission buffer states indicates that the transmission buffer is empty, the DCI further includes an indicator indicating that the base station confirms the empty state of the transmission buffer, and
    if the UE receives the indicator, the codeword corresponding to ACK is not transmitted to the base station.

3. The method according to claim 1, wherein the information about the transmission buffer states is multiplexed with uplink data and is transmitted.

4. The method according to claim 1, wherein the ACK/NACK information is indicated through a predetermined field of the DCI.

5. The method according to claim 4, wherein the predetermined field is a new data indicator (NDI) field.

6. The method according to claim 1, further comprising receiving a physical HARQ indicator channel (PHICH) of the first and second codewords from the base station,
    wherein the DCI is transmitted from the base station after P (0≤P≤α, α being a predetermined natural number) subframes from a subframe in which the PHICH is transmitted.

7. A method of receiving uplink multiple-codeword hybrid automatic repeat request (HARQ) transmission, the method comprising:
    receiving, at a base station, first and second codewords from a user equipment;
    receiving information about transmission buffer states of the first and second codewords from the user equipment;
    transmitting downlink control information (DCI) including acknowledgement (ACK)/negative acknowledgement (NACK) information for each of the first and second codewords to the user equipment, wherein the ACK/NACK information is provided to the user equipment by using a Physical Downlink Control Channel (PDCCH) without using a Physical HARQ Indication Channel (PHICH); and
    receiving a retransmitted codeword corresponding to NACK,
    wherein, when transmitting the DCI including control information for scheduling a new uplink transmission for the codeword corresponding to ACK, a codeword corresponding to ACK is not received by the base station when the transmission buffer for the codeword corresponding to ACK is empty, and
    wherein the transmission buffer of the user equipment is for temporarily storing data to be transmitted for each of the first and second codewords and is different from a HARQ buffer being used by the user equipment for storing data for a retransmission of previously transmitted data.

8. The method according to claim 7, wherein:
    if the information about the transmission buffer states indicates that the transmission buffer is empty, the DCI further includes an indicator indicating that the base station confirms the empty state of the transmission buffer, and
    if the UE receives the indicator corresponding to ACK is not transmitted from the user equipment.

9. The method according to claim 7, wherein the information about the transmission buffer states is multiplexed with uplink data and is transmitted.

10. The method according to claim 7, wherein the ACK/NACK information is indicated through a predetermined field of the DCI.

11. The method according to claim 10, wherein the predetermined field is a new data indicator (NDI) field.

12. The method according to claim 7, further comprising transmitting a physical HARQ indicator channel (PHICH) of the first and second codewords to the user equipment,
    wherein the DCI is transmitted from the base station after P (0≤P≤α, α being a predetermined natural number) subframes from a subframe in which the PHICH is transmitted.

13. A user equipment for performing uplink multiple-codeword hybrid automatic repeat request (HARQ) transmission, the user equipment comprising:
    a transmission module configured to transmit an uplink signal to a base station;
    a reception module configured to receive a downlink signal from the base station; and
    a processor configured to:

control the user equipment including the reception module and the transmission module, transmit, to the base station, first and second codewords and information about transmission buffer states of the first and second codewords through the transmission module, receive downlink control information (DCI) including acknowledgement (ACK)/negative acknowledgement (NACK) information for each of the first and second codewords through the reception module, wherein the ACK/NACK information is obtained by decoding a Physical Downlink Control Channel (PDCCH) without decoding a Physical HARQ Indication Channel (PHICH), and retransmit a codeword corresponding to NACK through the transmission module, wherein, when receiving the DCI including control information for scheduling a new uplink transmission for the codeword corresponding to ACK, a codeword corresponding to ACK is not transmitted to the base station when the transmission buffer for the codeword corresponding to ACK is empty, and wherein the transmission buffer of the user equipment is for temporarily storing data to be transmitted for each of the first and second codewords and is different from a HARQ buffer being used by the user equipment for storing data for a retransmission of previously transmitted data.

14. A base station for receiving uplink multiple-codeword hybrid automatic repeat request (HARQ) transmission, the base station comprising:

a transmission module configured to transmit a downlink signal to a user equipment;

a reception module configured to receive an uplink signal from the user equipment; and a processor configured to:

control the base station including the reception module and the transmission module, receive, through the reception module, first and second codewords and information about transmission buffer states of the first and second codewords, transmit downlink control information (DCI) including acknowledgement (ACK)/negative acknowledgement (NACK) information for each of the first and second codewords through the transmission module, wherein the ACK/NACK information is provided to the user equipment by using a Physical Downlink Control Channel (PDCCH) without using a Physical HARQ Indication Channel (PHICH), and receive retransmission of a codeword corresponding to NACK through the reception module, wherein, when transmitting the DCI including control information for scheduling a new uplink transmission for the codeword corresponding to ACK, a codeword corresponding to ACK is not received by the base station when the transmission buffer for the codeword corresponding to ACK is empty, and wherein the transmission buffer of the user equipment is for temporarily storing data to be transmitted for each of the first and second codewords and is different from a HARQ buffer being used by the user equipment for storing data for a retransmission of previously transmitted data.

\* \* \* \* \*